United States Patent [19]
Polyakov et al.

[11] Patent Number: 5,473,742
[45] Date of Patent: Dec. 5, 1995

[54] METHOD AND APPARATUS FOR REPRESENTING IMAGE DATA USING POLYNOMIAL APPROXIMATION METHOD AND ITERATIVE TRANSFORMATION-REPARAMETRIZATION TECHNIQUE

[75] Inventors: Vladislav G. Polyakov; Mikhail A. Ryleev, both of Moscow, Russian Federation

[73] Assignee: Paragraph International, Campbell, Calif.

[21] Appl. No.: 200,046

[22] Filed: Feb. 22, 1994

[51] Int. Cl.⁶ .................................................. G06T 11/00
[52] U.S. Cl. ........................... 395/142; 395/150; 395/140
[58] Field of Search .................................... 395/133–139, 395/142, 155, 161, 140, 141, 150, 151; 382/13, 56

[56] References Cited

U.S. PATENT DOCUMENTS

| | | | |
|---|---|---|---|
| 5,091,975 | 2/1992 | Berger et al. | 382/56 |
| 5,115,479 | 5/1992 | Murayama | 395/142 |
| 5,253,336 | 10/1993 | Yamada | 395/142 |
| 5,309,521 | 5/1994 | Matsukawa | 395/142 |
| 5,313,527 | 5/1994 | Guberman et al. | 382/13 |
| 5,325,477 | 7/1994 | Kalssen | 395/142 |

OTHER PUBLICATIONS

V. G. Polyakov, et al. "Choice of Parametric Representation in Numerical Approximation and Encoding of Curves," *Problemy Peredachi Informatsii* 47–58, Jul.–Sep., 1984.

Commonly Assigned and Allowed U.S. Patent Application Ser. No. 07/954,351, filed Sep. 24, 1992 titled "Method and Apparatus for Recognizing Cursive Writing from Sequential Imput Information."

V. G. Polyakov, S. Kostygov, A. Sobolev, V. Dubitsky. "A New Coding Technique for Holter ECG Recorders: 50:1 Compression and Precise Reconstruction." *European Heart Journal*, v. 11, Aug. 1990, XIIth Congress of the European Society of Cardiology, p. 411. (in English).

E. A. I. Aidu, "Sblizhenie navedenie. Algoritm srednekvadraticheskogo priblizhenia linij". [Confluence and Induction. Algorithm of Mean–Square Approximation of Lines]. *Algoritmy obrabotki experimental'nykh dannykh*. [*Algorithms for Processing of Experimental Data*], Moscow: Nauka Publishing House, 1986, pp. 5–21. (In Russian).

V. G. Polyakov, E.A.I.Aidu, V. S. Nagornov, V. S. Trunov. "Adaptivnoe kodirovanie geometricheskikh form c vyborom parametricheskogo predstavlenia" ["Adaptive Coding of Geometrical Shades with Selection of Parametric Representation"] *Shestoj Mezhdunarodnyi Symposium po teorii informatsii* [*The Sixth International Symposium on Information Theory, Synopsis of Presentations*]. Moscow–Tashkent, 1984, Part II, pp. 137–140. (In Russian).

V. A. Nagornov. "Kvadratichnye priblizhenia s vyborom parametra v zadache codirovania krivykh" [Mean–Square Approximations with the Parameter Selection in the Problem of Curve Coding], *The Sixth International Symposium on Information Theory. Synopsis of Presentations*. Moscow–Tashkent, 1984, Part II), pp. 124–126. (In Russian).

(List continued on next page.)

*Primary Examiner*—Almis R. Jankus
*Attorney, Agent, or Firm*—Townsend and Townsend and Crew

[57] ABSTRACT

A piecewise parametric polynomial curve-fitting method using an iterative transformation-reparametrization technique is used to compress information describing lines, such as those formed by handwritten lines, for storage in a compressed form in a computer. The curve-fitting method is applied iteratively with adaptive segmenting of curve segments to optimize piecewise approximations of complex curves. Each piecewise segment is iteratively lengthened, parameterized with an updatable parametrization table, and approximated using a cosine-type transform. To minimize approximation errors, both the accuracy and the trend of the approximation errors are monitored. In order to match end-point positions of the piecewise approximation segments, the cosine coefficients representing each piecewise segment are modified in view of the edge conditions so the segments properly abut one another upon reconstruction.

24 Claims, 12 Drawing Sheets

OTHER PUBLICATIONS

V. S. Nagornov, V. G. Polyakov. "K vyboru parametricheskogo predstavlenia krivykh pri tsifrovom opisanii I obrabotke ploskikh figur"[Selecting Parametric Representation of Curves in Digital Description and Processing of Plane Figures] *Tsifrovaia obrabotka signalov I ejo primenenia* ]*Digital Processing of signals and Its Application*]. Moscow: Nauka Publishing House, 1981, pp. 71–77. (In Russian).

E. Persoon, K. S. Fu. "Shape Discrimination Using Fourier Descriptors"*IEEE Trans. on Systems, Man, and Cybernetics*, v. SMC-7, No. 3, Mar. 1977. pp. 170–179. (In English).

I. Sh. Pinsker, "Opeznavanie vektornykh funktsij I linij" [Recognition of Vector–Functions and Lines] *Opoznavanie I opisanie linij* [Recognition and Description of Lines], Moscow: Nauka Publishing House, 1972, pp. 7–29. (In Russian).

V. V. Shakin. "Prestye algoritmy klassificatsii linij" ]Simple Algorythms of Line Classification], *Opozynavanie I opisanie linij* [*Recognition and Description of Lines*], Moscow: Nauka Publishing House, 1972, pp. 40–46. (In Russian).

G. G. Wainshtain. "Ob optimal'nom upravlenii slediashchei razvertkoi" [On Optimal Control by Tracing Scanner], *Dokl. nautchnotechni. konf po itogam nautchno–issled. rabot za 1966–1967 gg. Podsesektsia avtomatiki I telemechaniki* [*Presentations at a Scientific–Technical Conference on Scientific–Research Results for 1966–1967, Subsection of Automatics and Telemechanics*]. Moscow, MEI [Moscow Power Institute], 1967, Part 11, pp. 140–146. (In Russian).

I. V. Kantorovich, V. I. Krylov. Approximate Methods of Higher Analysis. Interscience Publishers, Inc. New York, P. Noordhoff Ltd. Groningen, the Netherlands, 1958. pp. 451–459. (In English).

SOURCE CURVE REPRESENTED BY TIME-SAMPLING POINTS

| NUMBER OF SAMPLING POINT (n) | 0 | 1 | 2 | 3 | 4 | 5 | 6 | 7 | 8 |
|---|---|---|---|---|---|---|---|---|---|
| DISTANCE TO STARTING POINT | 0 | 15.3 | 30.6 | 45.9 | 61.2 | 76.5 | 91.8 | 117.1 | 132.4 |

NORMALIZED PARAMETRIZATION TABLE CALCULATED AT THE BEGINNING STAGE

| NUMBER OF SAMPLING POINT (n) | 0 | 1 | 2 | 3 | 4 | 5 | 6 | 7 | 8 |
|---|---|---|---|---|---|---|---|---|---|
| DISTANCE TO STARTING POINT | 0 | 3.7 | 11.3 | 23.2 | 41.8 | 57.3 | 64.4 | 75.1 | 80.9 |

PARAMETRIZATION TABLE DERIVED FROM THE 'FIRST ITERATION' APPROXIMATE SEGMENT

| NUMBER OF SAMPLING POINT (n) | 0 | 1 | 2 | 3 | 4 | 5 | 6 | 7 | 8 |
|---|---|---|---|---|---|---|---|---|---|
| DISTANCE TO STARTING POINT | 0 | 6.3 | 15.9 | 28.9 | 56.3 | 80.2 | 87.9 | 104.2 | 113.7 |

PARAMETRIZATION TABLE DERIVED FROM THE 'SECOND ITERATION' APPROXIMATE SEGMENT

FINAL RESULT. 12 THIRD-DEGREE POLYNOMIAL SEGMENTS.
THE BORDERS BETWEEN SEGMENTS ARE SHOWN

METHOD AND APPARATUS FOR REPRESENTING IMAGE DATA USING POLYNOMIAL APPROXIMATION METHOD AND ITERATIVE TRANSFORMATION-REPARAMETRIZATION TECHNIQUE

BACKGROUND OF THE INVENTION

This invention relates to the representation of information representative of image data, particularly line-drawn graphics. In particular, the invention relates to using parametric trigonometric polynomials to represent curves.

There are many techniques for representing line-drawn graphics, such as curves, in compressed form. One such method involves the selection of a pair of polynomials for the approximated parametric representation of a given planar curve. Generally speaking, the higher the order, the better the approximation for a given curve.

A general theoretical background on the abstract problems associated with the selection of the most suitable pair of the polynomials for representing a given curve is presented by Blagovest Sendov, *Theory of Approximation of Functions* 322–29 (Moscow, Nauka 1977) (in Russian), and/or "Some Problems of the Theory of Approximation of Functions and Sets in Hausdorff Metric," *Usp. Mat. Nauk*, 24, No. 5(149), pp. 141–78 (1969).

A theoretical discussion of a method for finding a serviceable pair of polynomials using an iterative transformation-reparametrization process can be found in the 1983 publication by V. G. Polyakov et al., "Choice of Parametric Representation in Numerical Approximation and Encoding of Curves," (Translated from 20:3 *Problemy Peredachi Informatsii* 47–58, July–Sept., 1984), incorporated herein by reference. It is presumed here that those of ordinary skill in the relevant art are familiar with the aforementioned Polyakov article.

For complicated curves, the process contemplated by the prior Polyakov paper takes a relatively long time to complete approximations due to low convergence and the high degree of precision needed for computation. Furthermore, some applications require real-time approximation of the trajectory curves. For example, applications such as telewriting require on-line approximation of handwriting and drawing as the pen moves over the pad. In these situations, piecewise approximation is desirable. However, it is difficult to obtain good quality approximation and efficient representation using known piecewise approximation approaches such as splines.

What is desired is an improved compression-oriented piecewise polynomial approximation method which can employ the advantages of the iterative transformation-reparametrization technique in order to improve the compression efficiency for complicated curves.

SUMMARY OF THE INVENTION

According to the invention, in a digital computer system, a transformation-reparametrization method involves iterative curve approximation in a form suitable for piecewise parametric polynomial curve fitting so that representations of curves, such as those formed by handwritten lines, can be stored in compressed form in a computer memory or transmitted in compressed form to other computers. The curve-fitting method involves iterative transformation-reparametrization of curve segments. Each piecewise segment is iteratively lengthened, parameterized using an updatable parametrization table, and approximated using a cosine-type transform. In order to match end-point positions of the piecewise approximation segments, the cosine coefficients for each piecewise segment are modified in view of the specific edge conditions so the segments properly abut one another.

In a specific embodiment, a pen tablet acquires and samples a handwritten input by sampling points in an array, for example, in a Cartesian coordinate system. From one origin of the input curve, an initial segment is arbitrarily created and iteratively lengthened and approximated by polynomial approximation using the transformation-reparametrization procedure. The segment is parameterized using an updatable parametrization table and approximated using a cosine-type transform, thereby forming a set of cosine coefficients representing the segment. The cosine coefficients are then truncated according to the chosen degree of approximation. The set of truncated cosine coefficients is then modified using specific edge conditions to permit the segments to properly abut one another upon reconstruction. During each iteration, both the accuracy and the trend of the approximation errors are monitored. If the approximation accuracy is inadequate, transformation-reparametrization of the segment continues for at least one more iteration. If the trend of the approximation errors does not tend toward a predetermined goodness-of-fit threshold for a predetermined number of iterations, the segment currently under approximation is finished, a new segment is started from where the finished segment ended, and piecewise approximation of the input curve with a new approximating segment continues from where the last approximating segment ends. Other segments along the curve are approximated, modified, and stored until the entire curve is approximated segment-by-segment and stored in compressed form.

The invention will be better understood upon reference to the following detailed description in connection with the accompanying drawings.

DESCRIPTION OF SPECIFIC EMBODIMENTS

Figure 1A:
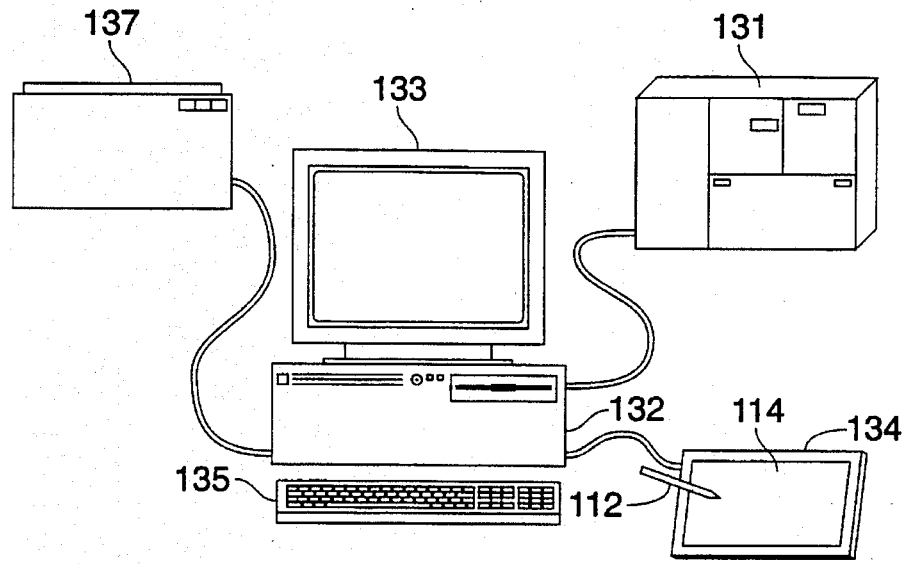
FIG. 1A is a simplified diagram of an apparatus of the present invention.

FIG. 1A shows a representative apparatus incorporating the present invention. In one embodiment of the invention, a digitizer 134 samples a handwritten sample input with/by a pen 112 or stylus upon a pad 114 of digitizer 134. Digitizer 134 converts the sample from a graphical format, which might be, for example, a signature on a check, a handwritten line on an application form, or an arbitrary handwritten input to a pen-based computer system, to a binary format in the form of sampled coordinates in x and y of a Cartesian coordinate system. The binary format data is expressed as digital words suitable for transmission to a computer 132. Upon receipt of the binary data representing the handwritten sample, computer 132 compresses the binary data by performing piecewise polynomial approximation using the iterative transformation reparametrization technique on the binary data set. Optionally, entropy encoding can be performed following the piecewise polynomial approximation process to further compress the set of data representing the sample.

The set of data representing the sample is then stored in the memory space (discussed in connection with FIG. 1B) of computer 132 for subsequent reproduction and display on a display screen 133 or a printer 137. Furthermore, the set of compressed data obtained can be transmitted to a host or remote central computer 131, which can be a main-frame computer, a file-server, or another microcomputer. Other computers can subsequently retrieve the set of compressed data using methods well known in the art. Once retrieved, the compressed data can be restored for display in accordance with the principles of the present invention.

Figure 1B:
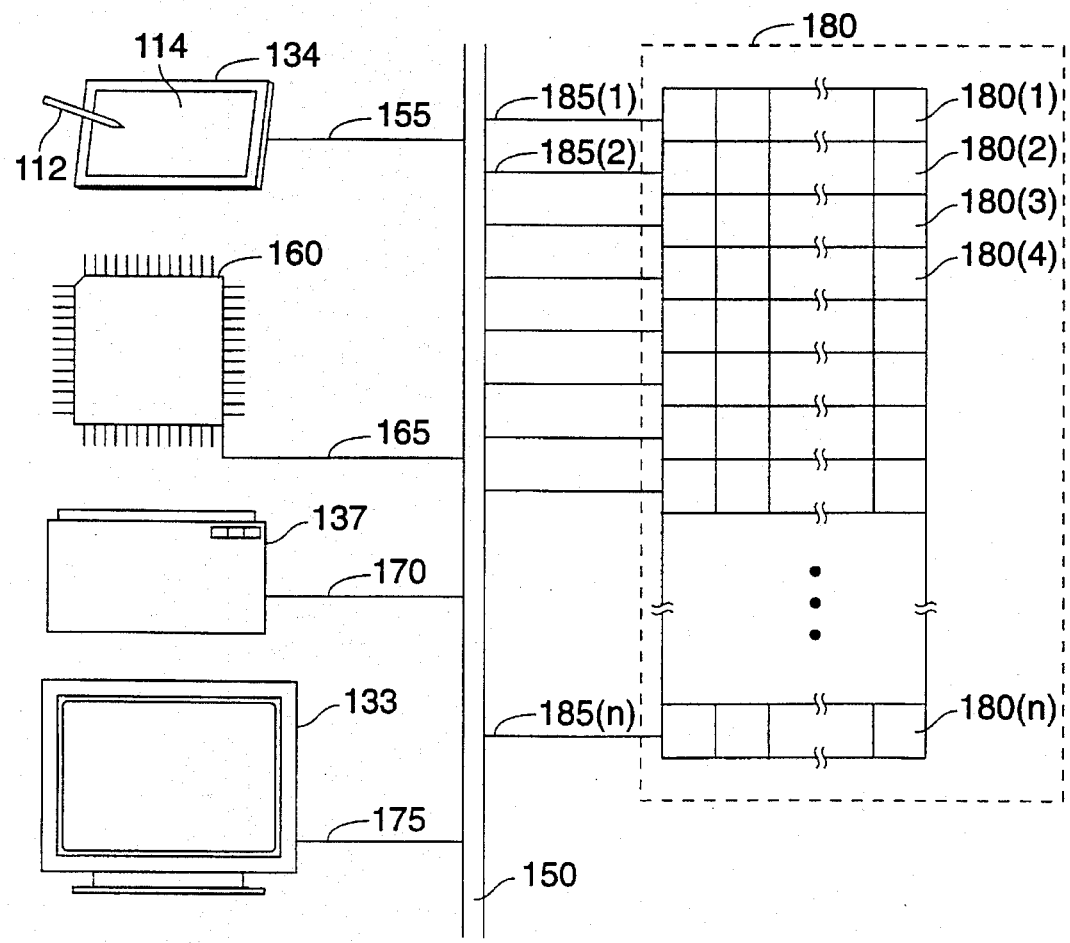
FIG. 1B shows in greater detail the operation of the apparatus of FIG. 1A.

FIG. 1B shows in greater detail the operation of the apparatus of FIG. 1A. Digitizer 134 samples a handwritten sample to be compressed from pen 112 and pad 114 in the manner discussed earlier. The binary data representing the handwritten sample is transmitted to a system bus 150 via a transmission link 155. A processor 160 is coupled to system bus 150 via a processor bus 165. Processor bus 165 comprises address and data lines for permitting processor 160 to communicate with the devices coupled to system bus 150.

A printer 137 is coupled to system bus 150 via a transmission link 170. FIG. 1B also shows a display screen 133 coupled to system bus 150 via a transmission link 175. As discussed, processor 160 can access both printer 137 and screen 133 via system bus 150 and the respective transmission link associated with each device.

A memory 180 comprising memory elements 180(1)–(n) is also shown. Each memory element, such as memory element 180(1), comprises a plurality of memory bits for storing binary data. The exact number of bits per memory element 180 varies with different computers and is immaterial to the purpose of the present invention. Although the choice is somewhat arbitrary, the present embodiment contemplates a computer system having 16 bits per memory element.

Each memory element 180(1)–(n) is coupled to system bus 150 through memory buses 185(1)–(n). Memory buses 185(1)–(n) comprise address and data lines, as well as control lines, for accessing memory elements 180(1)–(n). As can be appreciated, processor 160 can access memory elements 180(1)–(n) via system bus 150 and memory buses 185(1)–(n).

Figure 2:
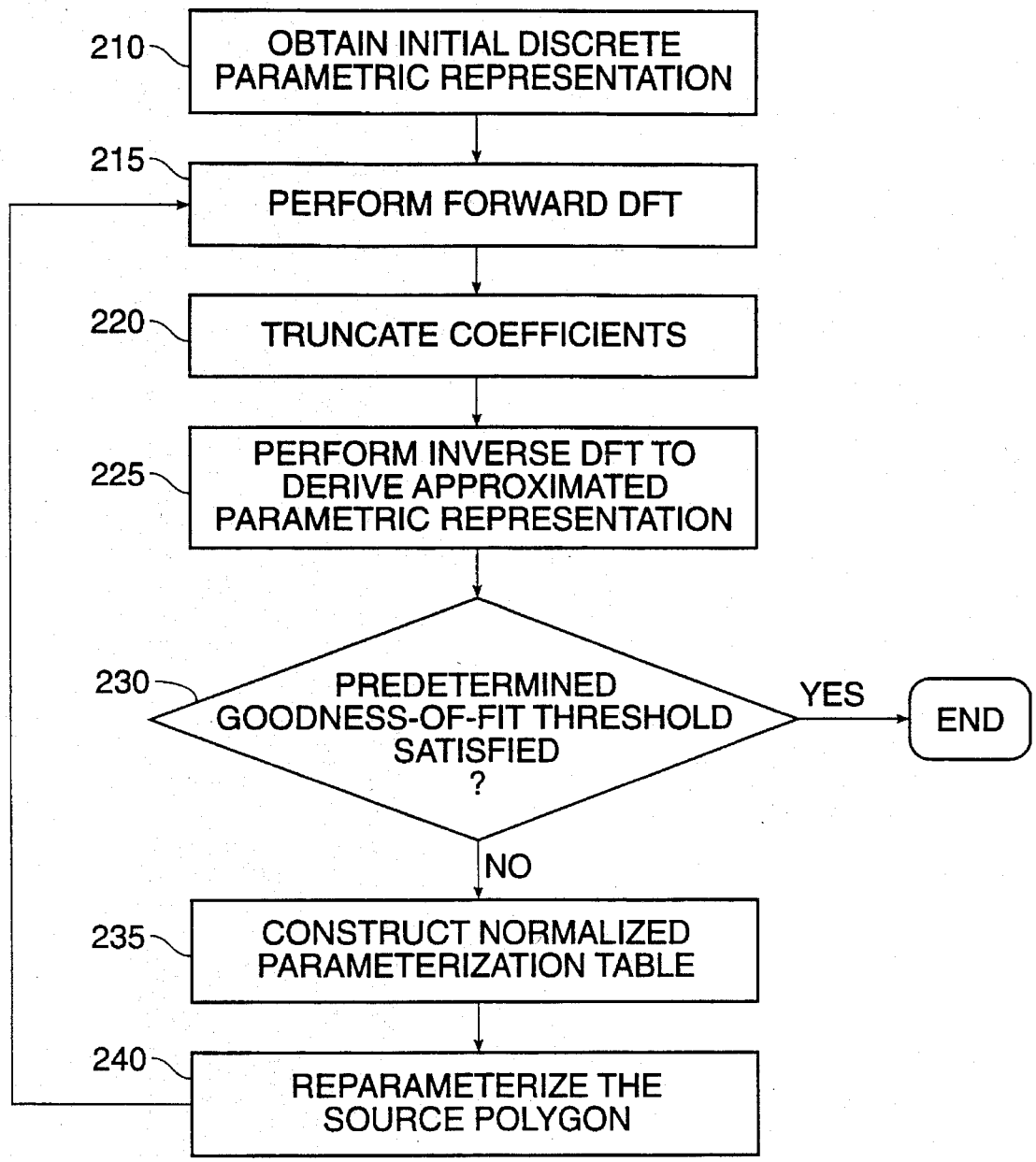
FIG. 2 is a simplified block diagram showing a polynomial approximation technique.

FIG. 2 is a flow chart illustrating a representative polynomial approximation technique of closed curves using iterative transformation reparametrization. It is not represented here that the polynomial approximation technique discussed in connection with FIG. 2 is prior art. The technique is herein disclosed and discussed as background material for understanding the disclosed and claimed invention. A source-discrete parametric representation of a closed curve is obtained using methods well known in the art (Step 210). Thereafter, a parametrization is performed. At this initial stage, the parameterizing step consists of constructing an arbitrary parametrization whose size is determined by the chosen size of the Discrete Fourier Transform. The arbitrary parametrization so constructed is designated the initial parametric representation. For example, arc length can be used as a parameter in the initial parametric representation. As a further example, if the size of the DFT is chosen to be 32, 32 equidistant sample points along the source curve can be used to form the initial parametric representation.

A set of Fourier coefficients is then obtained from the initial parametric representation using Discrete Fourier Transform (Step 215). The set of Fourier coefficients is attenuated in the following manner: any Fourier coefficient whose order is higher than the chosen degree of approximation is set to zero (Step 220). An approximate parametric representation is then computed from the attenuated set of Fourier coefficients using Inverse Discrete Fourier Transform (Step 225).

If the curve defined by the approximate parametric representation should satisfy a predetermined goodness-of-fit threshold (Step 230), the approximation ends. Alternatively, if the approximate curve fails the predetermined goodness-of-fit threshold, another iteration is performed in order to improve the quality of the approximate curve.

First, a parametrization table is computed using the approximate parametric representation which was obtained by inverse DFT. The distance from each sampling point to the initial sampling point along the curve defined by the approximate parametric representation is computed. The parametrization table contains a set of these values. The parametrization table is then normalized by multiplying each value in the table with a length-normalizing factor $\lambda k$ where k represents the number of iterations performed thus far (step 235). For example, $\lambda k$ is $\lambda 1$ in this first iteration. The length-normalization factor $\lambda k$ represents the ratio of the total length of the source curve divided by the total length of the curve defined by the approximate parametric representation.

One simple way to define a curve from its discrete parametric representation is to treat sampling points as vertexes of a polygon. The distance along the curve is in this case the distance along the polygon. The source curve is then reparameterized using the normalized parametrization table (step 240). In a similar manner, the sampling points of the source curve can be treated as vertexes of a polygon. This polygon is designated the source polygon. Each new sampling point is located on the source polygon at a respective distance from the initial sampling point. The respective distance is determined for each new sampling point from the normalized parametrization table.

The source polygon represented by the new sequence of sampling points is further approximated starting at step 215 in accordance with the above-discussed procedure. The new sequence of sampling points is approximated by DFT as a sequence of equidistant points with respect to the new parameters to effect reparametrization. The transformation-reparametrization procedure is repeated until either the predetermined goodness-of-fit threshold is satisfied or the procedure is converged.

Figure 3A:
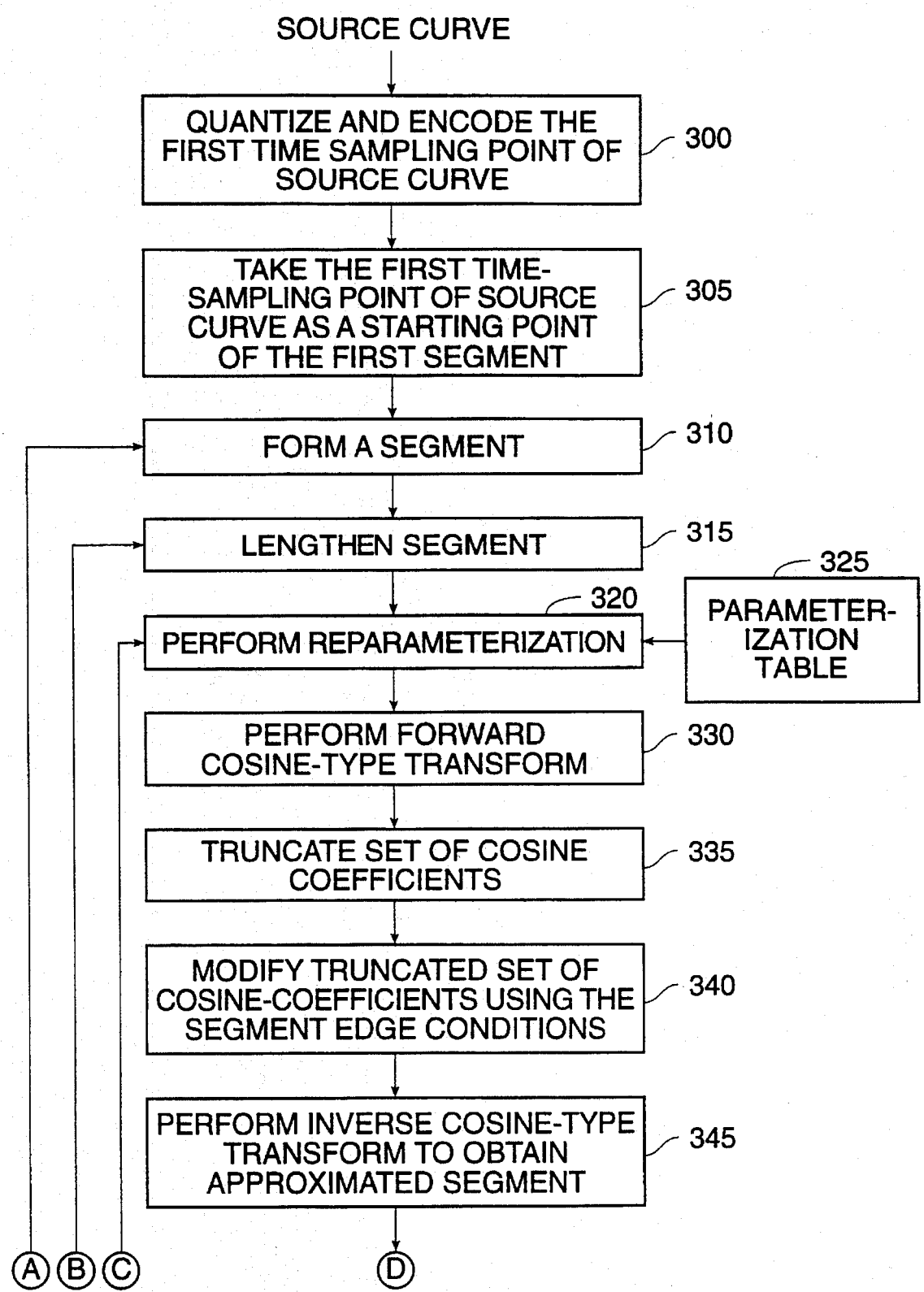
FIGS. 3A and 3B show a simplified block diagram showing an embodiment of the piecewise parametric polynomial curve fitting technique.
Figure 3B:
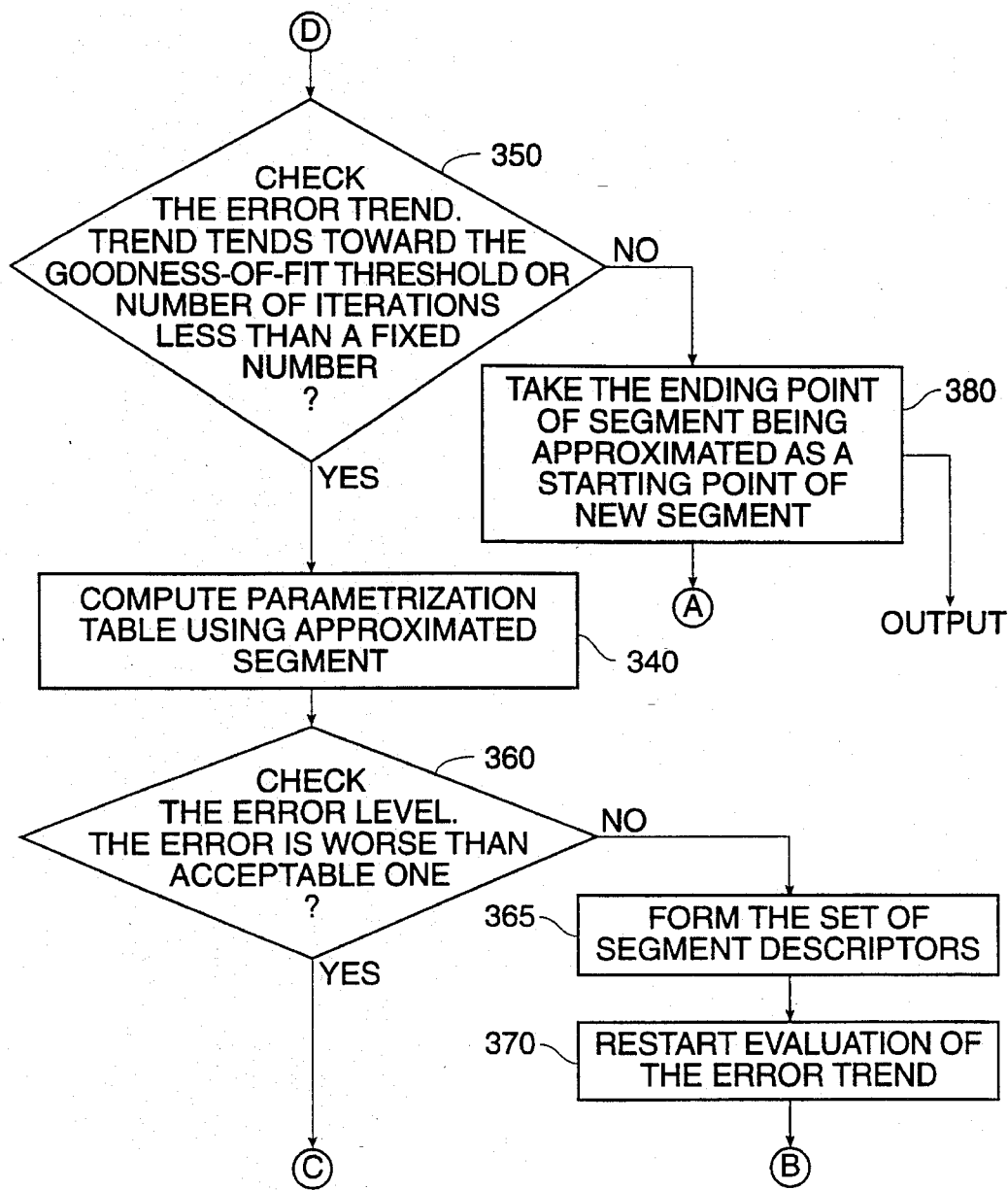
Figure 3C:
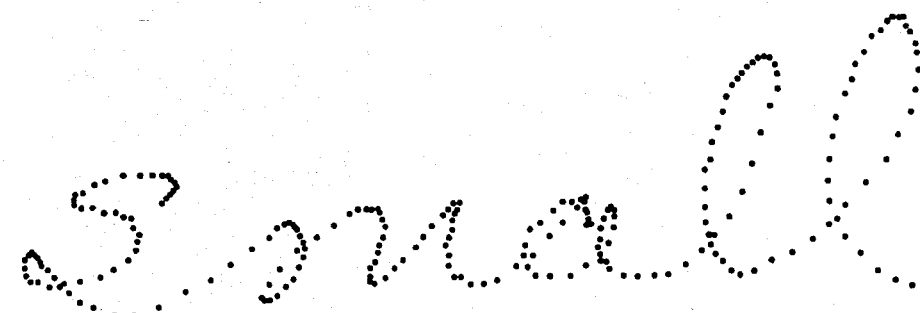
FIG. 3C shows an initial sequence of time-sampling points.

FIGS. 3A and 3B illustrate the piecewise polynomial approximation method using the iterative transformation-reparametrization technique in accordance with one embodiment of the present invention. A source curve, such as a pen stroke or a signature, is first time-sampled using a pen tablet or other devices well known in the art. Although time-sampling is used herein to illustrate the inventive technique, other sampling methods, such as spatial sampling, may also be used. The sequence of sampling points, such as that shown in FIG. 3C, is then stored in a memory or buffer of a computer. Each sampling point in the sequence is specified by a pair of rectangular coordinates (x,y).

Figure 3D:
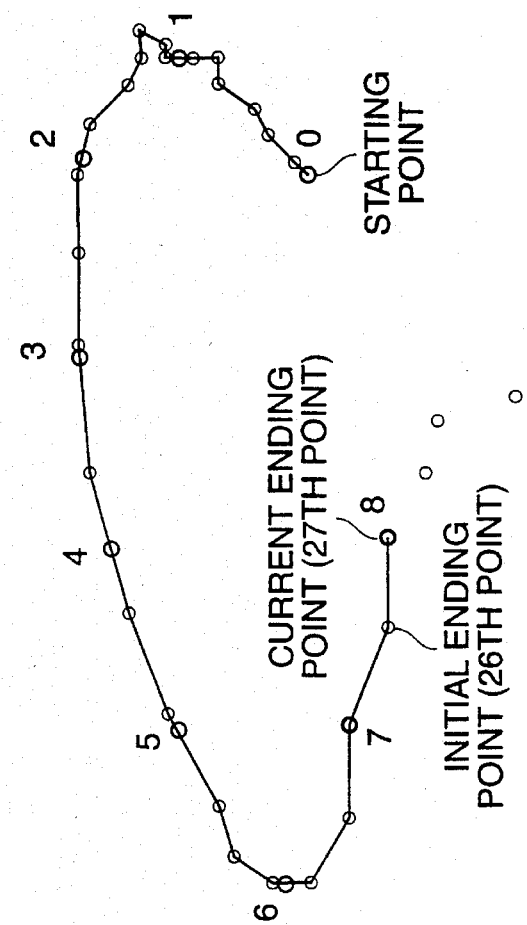
FIG. 3D shows a current segment to be approximated.

The coordinates of the first sampling point are quantized and encoded for use in the set of output descriptors of the pen stroke (Step 300). The first sampling point of the source curve is also taken as the starting point of the first segment (Step 305). At least one sampling point is appended to the first segment and the last sampling point appended thereto is temporarily designated the initial ending point or ending point of the first segment, thereby forming a first segment (Step 310). In FIG. 3D, 25 time-sampling points are appended to the starting point. Consequently, the 26th time-sampling point is the ending point of the first segment.

The following sampling point along the source curve is then appended to the first segment, thereby lengthening that first segment. The lengthened first segment represents the current segment to be approximated, with the sampling point last appended thereto designated the current ending point and the starting point of the first segment designated the fixed starting point (Step 315). The current segment to be approximated now has as its boundaries the fixed starting point $(x_s, y_s)$ and a current ending point $(x_e, y_e)$. FIG. 3D shows a current segment having as its current ending point the 27th time-sampling point. It should be pointed out that although this specific embodiment shows a point-by-point lengthening procedure, the current segment may be lengthened by appending a plurality of sampling points during each iteration.

Thereafter, the reparametrization of the current segment is performed. At the beginning stage an arbitrary initial parametrization table (step 325) of a predetermined size is calculated. For example, the arc length can be used as a parameter at the initial step and the corresponding normalized parametrization table contains the distances proportional to the number of sampling points starting from 0 for the starting point of the current segment and ending with the total length of the current segment. Alternatively, a preprogrammed initial parametrization table, which has been stored prior to the start of the reparametrization procedure, can be recalled from memory. The size of the table, i.e., the total number of points, corresponds to the chosen size of the discrete transform used. A normalized 9-point initial parametrization table is shown in FIG. 3D.

Because the current segment, as a rule, is not a closed curve, the cosine or cosine-type transform, as well as other approximation operators (procedures) setting a correspondence between a given sequence of samples and certain discrete cosine polynomials of a predetermined degree, can be used in the piecewise fitting transformation-reparametrization technique according to the present invention. In one embodiment, the cosine-type transform, obtained by means of a Discrete Fourier Transform (DFT), is used. The simple and well-known scheme of such a cosine-type transform assumes that the given sequence of samples is evenly continued before applying DFT. The even symmetry of a continued sequence yields, as a result of a forward DFT, a set of cosine coefficients only (the sine coefficients are reduced to zero).

The position of the last sample in the given sequence can be used as the position of an axis of even symmetry for a continued sequence. If the size of the DFT used to perform a cosine-type transform is chosen to be 2N, where N is a natural number, then N+1 sampling points, including the starting and ending points, can be located along the current segment of the source curve in accordance with distances to the starting point specified by the normalized parametrization table. For the 9-point parametrization in FIG. 3D, a 16-point DFT is used. The reparameterized current segment is represented by a pair of coordinate sequences $$\{x_n\}, \{y_n\}; n=0, 1, \ldots, N, \qquad (1)$$

where $x_n, y_n$ are the coordinates of the n-th sampling point;

$$x_0 = x_s, \ y_0 = y_s; \ x_N = x_e, \ y_N = y_e.$$

Thereafter, the forward cosine-type transform is applied to coordinate sequences (1) (Step 330), and the set of cosine coefficients obtained by a forward cosine-type transform is truncated according to the chosen degree of approximation (Step 335). Any coefficient so truncated is set to zero. For example, if the chosen degree of approximation is three, any coefficient having an order greater than 3 is truncated and set to 0. The remaining cosine coefficients are then modified (Step 340) as described below, to obtain polynomial approximations which permit the adjacent segments, upon reconstruction, to properly abut one another.

Let the degree of approximation chosen be M. This means that a pair of M-degree discrete cosine polynomials is specified by a truncated and modified set of coefficients to obtain the (N+1)-sized numerical parametric representation $$\{\bar{x}_n\}, \{\bar{y}_n\}; n=0, 1, \ldots, N, \qquad (2)$$

of the approximate current segment using inverse cosine-type transform $$\bar{x}_n = A_0 + \sum_{m=1}^{M} A_m \cos m \frac{n}{M} \pi; \qquad (3)$$

$$\bar{y}_n = B_0 + \sum_{m=1}^{M} B_m \cos m \frac{n}{N} \pi;$$

$$n = 0, 1, \ldots, N,$$

where A and B denote the modified coefficients.

The coefficients can be modified, for example, in order to use the definite fixed ending point of the previous approximate segment as the starting point $(\bar{x}_s, \bar{y}_s)$ of the current approximate segment. In other words, the starting point $(\bar{x}_s, \bar{y}_s)$ of the current approximate segment can be the same as the ending point of the actually obtained previous segment. In this case the modified coefficients must satisfy two specific edge conditions (setting n to zero in (3)).

$$\bar{x}_s = \bar{x}_0 = A_0 + \sum_{m=1}^{M} A_m;$$

$$\bar{y}_s = \bar{y}_0 = B_0 + \sum_{m=1}^{M} B_m;$$

where $(\bar{x}_s, \bar{y}_s)$ are fixed known values. These modified coefficients also satisfy the general condition that they are chosen to be as close as possible to the non-modified coefficients which were obtained by the cosine-type transform.

The current approximate segment, as another example, can save as its boundaries the fixed starting sampling point $(x_s, y_s)$ and the current ending sampling point $(x_e, y_e)$ of the corresponding current segment of the source curve. In this case the modified coefficients must satisfy four specific edge conditions:
two conditions for starting points (setting n to zero in (3))

$$x_s = \bar{x}_o = A_0 + \sum_{m=1}^{M} A_m; \quad (I)$$

$$y_s = \bar{y}_o = B_0 + \sum_{m=1}^{M} B_m; \quad (II)$$

and two conditions for the current ending points (setting n to N in (3))

$$x_e = \bar{x}_N = A_0 + \sum_{m=1}^{M} (-1)^m A_m; \quad (III)$$

$$y_e = \bar{y}_N = B_0 + \sum_{m=1}^{M} (-1)^m B_m. \quad (IV)$$

Furthermore, these modified coefficients also satisfy the general condition that they are chosen to be as close as possible to the non-modified coefficients which were obtained by the forward cosine-type transform.

The iterative transformation-reparametrization process according to the present invention utilizing edge conditions (I)–(IV) turns, as is apparent, into a piecewise polynomial interpolation process with a nonpredetermined number and location of interpolation knots.

Examples of the edge conditions described above reflect the requirements of the zero-order geometrical continuity. It should be pointed out that additional edge conditions can be used in connection with higher-order geometrical continuity. The total number of edge conditions utilized should be less than the total number of cosine coefficients (2M+2 in the previously described embodiment) in the truncated set to perform the iterative piecewise polynomial approximation procedure according to the present invention.

The following description relates to one embodiment of the present invention which utilizes the edge conditions (I)–(IV). Assuming the total number of conditions to be four, one suboptimal, albeit simple, way to meet edge conditions (I)–(IV) is to save the truncated set of coefficients obtained by the forward cosine-type transform without the four (accoding to the number of edge conditions) coefficients to be modified, e.g., without the four coefficients of the lowest degrees. In this case coefficients $A_2, A_3, \ldots, A_M$ in conditions (I), (III) and $B_2, B_3, \ldots, B_M$ in conditions (II), (IV) are replaced by known non-modified coefficients $a_2, a_3, \ldots, a_M$ and $b_2, b_3, \ldots, b_M$, respectively, and unknown values of modified coefficients $A_0, A_1$ and $B_0, B_1$ are calculated, according to (I)–(IV), as linear combinations.

$$A_0 = x_s + x_e - \frac{1}{2} \sum_{m=1}^{L} a_{2m}; \quad (V)$$

$$A_1 = x_s - x_e - \frac{1}{2} \sum_{m=1}^{L} a_{2m-1}; \quad (VI)$$

$$B_0 = y_s + y_e - \frac{1}{2} \sum_{m=1}^{L} b_{2m}; \quad (VII)$$

$$B_1 = y_s - y_e - \frac{1}{2} \sum_{m=1}^{L} b_{2m-1}; \quad (VIII)$$

$$L = \begin{cases} \frac{M}{2} & \text{if } M \text{ is even,} \\ \frac{M-1}{2} & \text{if } M \text{ is odd.} \end{cases}$$

The truncated and linearly modified set of cosine coefficients is thereafter used to obtain, via inverse cosine-type transform (3), the approximate current segment specified by its (N+1)-point discrete parametric representation (2) (Step 345). Because of the modification operations, the approximation operator happens to be a not strictly orthogonal (but still linear) operator. This is the approximation operator that was actually involved in the transformation-reparametrization process, as described above, to put the polynomials (3) in correspondence with given sequences of samples (1).

The current segment of the source curve and the approximate current segment, in spite of their coincidence of boundary points, are, however, different one from another due to approximation error. To minimize approximation error, the iterative transformation-reparametrization cycle is controlled by monitoring the approximation error. For example, the mean square error between the m-point representation of the reparameterized segment (1) and the corresponding approximate segment (2) can be used as long as there is a good correspondence with subjective (visual) goodness-of-fit evaluation of handwriting and drawings upon reconstruction. For details regarding the calculation of the approximate error and the error trend, reference should be made to step 350 of the accompanying pseudo-code program I. The iterations are counted starting from the lengthening step 315 in FIG. 3A.

Figure 3E:
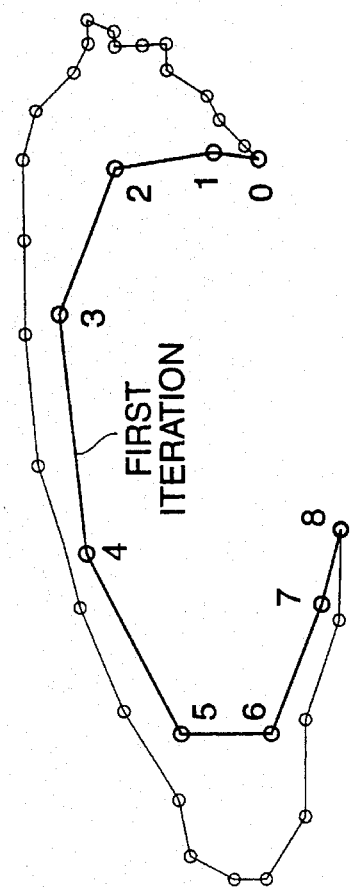
FIG. 3E shows the current approximate segment and its corresponding parametrization table.

FIG. 3B is a continuation of FIG. 3A. At the first stage of error monitoring (Step 350) the trend of approximation error for several latest iterations is evaluated. If the approximation error tends toward a predetermined goodness-of-fit threshold for, say, four latest iterations or if the number of iterations is less than four, the transformation-reparametrization cycle continues (conditional transition YES at Step 350, FIG. 3B), and a new parametrization table is derived (Step 355) from the current approximate segment obtained at Step 345 to prepare for the next reparametrization. FIG. 3E shows the current approximate segment after one iteration. Since less than 4 iterations have been performed to obtain the current approximate segment (denoted as "first iteration" in FIG. 3E), a new 9-point parametrization table is derived at step 355 from that approximate segment. The distances from the sampling points to the starting point along the "first iteration" segment, which is represented by the 9-vertex polygon, are calculated to derive the new parametrization table shown in FIG. 3E. It should be pointed out here that although four iterations are used in this specific embodiment to check for the error trend, it is acceptable to check for the error trend using a greater or smaller number of iterations.

At the second stage of error monitoring, (Step 360), the level of approximation error is checked against a predetermined goodness-of-fit threshold. If the achieved approximation error is worse than the predetermined goodness-of-fit threshold (conditional transition YES at Step 360), the current segment of the source curve bounded by the same current ending point is again reparameterized (the representation (1) is updated at Step 320), and approximated (the representation (2) is updated at Step 345) to decrease the approximation error.

On the other hand, if the approximation error is equal or better than the predetermined goodness-of-fit threshold (conditional transition NO at Step 360), a set of current segment descriptors is formed and stored (Step 365). The transformation-reparametrization cycle continues in order to determine whether a lengthened version of the current segment can also be successfully approximated. In other words, the evaluation of the error trend to be checked later on at Step 350 is restarted (Step 370). The next sampling point of the source curve is appended to the current segment, thereby lengthening the segment to be reparameterized and approximated (Step 315). The current parametrization table which was derived from the approximation of the current segment bounded by the previous sampling point is used, after proper normalization, to reparameterize the lengthened current segment (Step 320). The iterative process is thereafter continued with transformation, modified by updated edge conditions (III) and (IV) (and by the same edge conditions (I) and (II)).

One convenient way to form the set of the current segment descriptors (Step 365) is to include in the set of descriptors the ending point $(x_e, y_e)$ of the current segment. The remaining part of the set is then the truncated and modified set of cosine coefficients without any four coefficients, for example, without the four coefficients $A_0, A_1, B_0, B_1$ of the lowest degrees. If the first sampling point of the source curve is known, the abridged coefficients can be calculated using edge conditions (I)–(IV) at the decoding (decompression) stage. The truncated set of coefficients additionally reduced as described above is designated the truncated and abridged set. The advantages of a set of segment descriptors consisting primarily of the coordinates of the bordering points as well as the truncated and abridged set of cosine coefficients will be apparent from the description of the encoding and decoding procedures given below.

The iterative transformation-reparametrization process of approximation and gradual lengthening of the current segment along the source curve, with respective evolution of the parametrization table for reparametrization operations, as well as with modification of the edge conditions for the transformation operations, continues in the manner described above until the newly lengthened current segment fails to be approximated with acceptable accuracy. In other words, if the approximation error does not tend toward the predetermined goodness-of-fit threshold, for, say, up to four latest iterations, the process is interrupted at the first stage of error monitoring (conditional transition NO at Step 350). The successfully approximate current segment which is bounded by the previous ending point, i.e., the ending point prior to the last lengthening step, is designated the finished segment. The set of descriptors of the finished segment, formed and stored up to this moment at Step 365, can optionally be further encoded, for example, via an entropy encoder (Step 375).

Figure 3F:
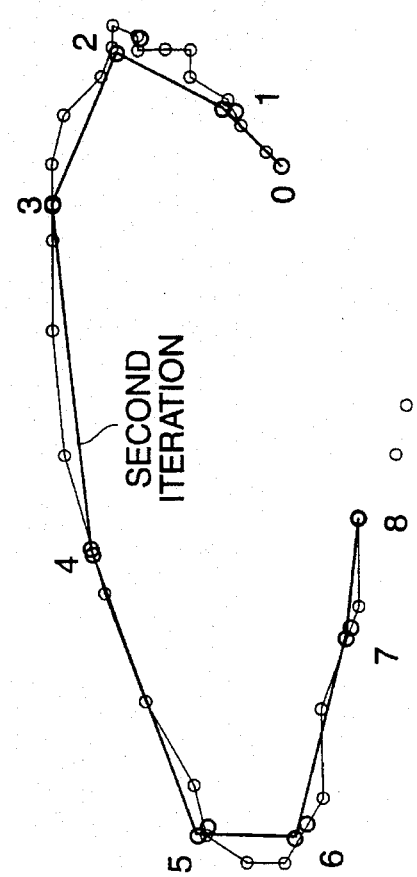
FIG. 3F. shows the resulting approximate segment after two iterations and its corresponding parametrization table.

FIGS. 3F–3J further illustrate the iterative transformation-reparametrization process. The approximation error calculated for the "first iteration" approximate segment happens to be worse than a predetermined threshold (conditional YES at step 360 in FIG. 3B). Consequently, the parametrization table shown in FIG. 3E is used, after proper normalization, to reparameterize at step 320 of FIG. 3A the same segment of the source curve. The resulting second approximate segment, designated "second iteration" in FIG. 3F, is obtained. Since less than 4 iterations have been performed, the transformation-reparametrization cycle continues (conditional YES at step 350 in FIG. 3B). A new parametrization table, shown in FIG. 3F, using the "second iteration" approximate segment (step 340 in FIG. 3B) is computed.

Figure 3G:
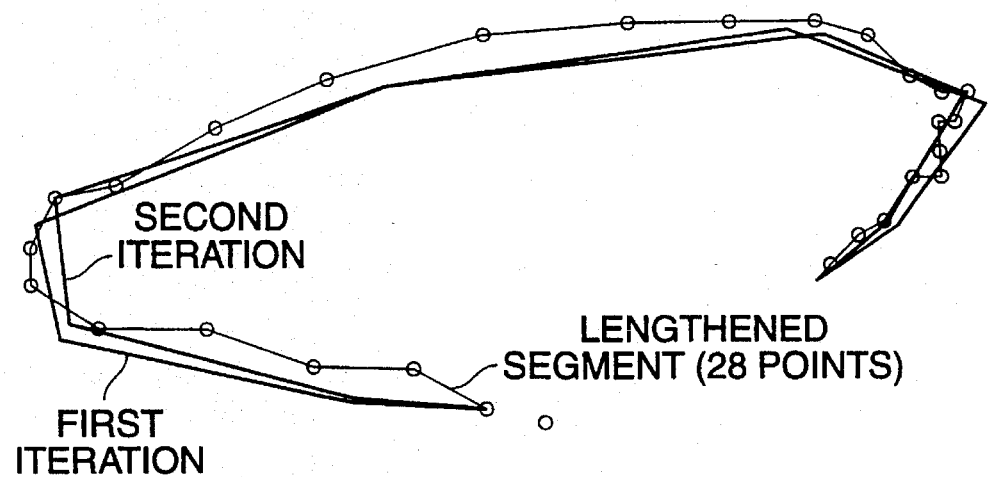
FIG. 3G. shows two approximate segments for the lengthened current segment associated with a first and second iteration.

In this example, the approximation error calculated for the "second iteration" approximate segment happens to be better than the predetermined threshold (conditional NO at step 360). A set of segment descriptors is formed for the "second iteration" approximate segment (step 365 in FIG. 3B). The evaluation of the error trend is restarted and the next time-sampling point is appended to lengthen the current segment (step 315 in FIG. 3A). The parametrization shown in FIG. 3F, normalized with respect to the lengthened current segment, is used to approximate the lengthened current segment. The resulting "first iteration" approximation for the lengthened current segment is shown in FIG. 3G.

As it happens, the error level for this "first iteration" approximation for the lengthened current segment is worse than the predetermined threshold. Consequently, a "second iteration" approximation of the lengthened current segment is obtained. This "second iteration" approximation of the lengthened current segment is shown in FIG. 3G.

The transformation-reparametrization proceeds as discussed with the "second iteration" approximation of the lengthened current segment. In this example, the approximation error for the "second iteration" of the lengthened current segment is better than the predetermined threshold (conditional NO at step 360 in FIG. 3B). The set of segment descriptors is formed, and the transformation-reparametrization procedure continues by further lengthening the lengthened current segment to 29 time-sampling points to determine whether this newly-lengthened current segment can also be successfully approximated.

Figure 3H:
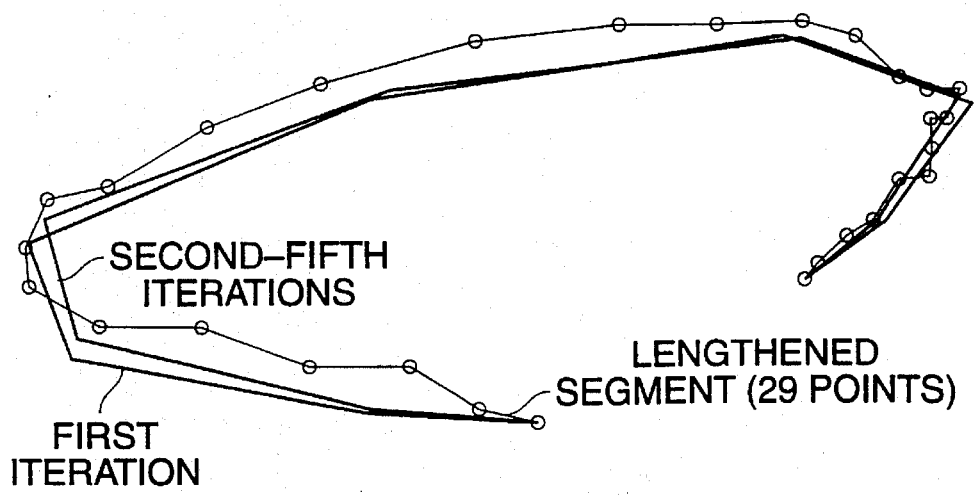
FIG. 3H. shows the approximate segments for the lengthened current segment associated with the first five iterations.
Figure 3I:
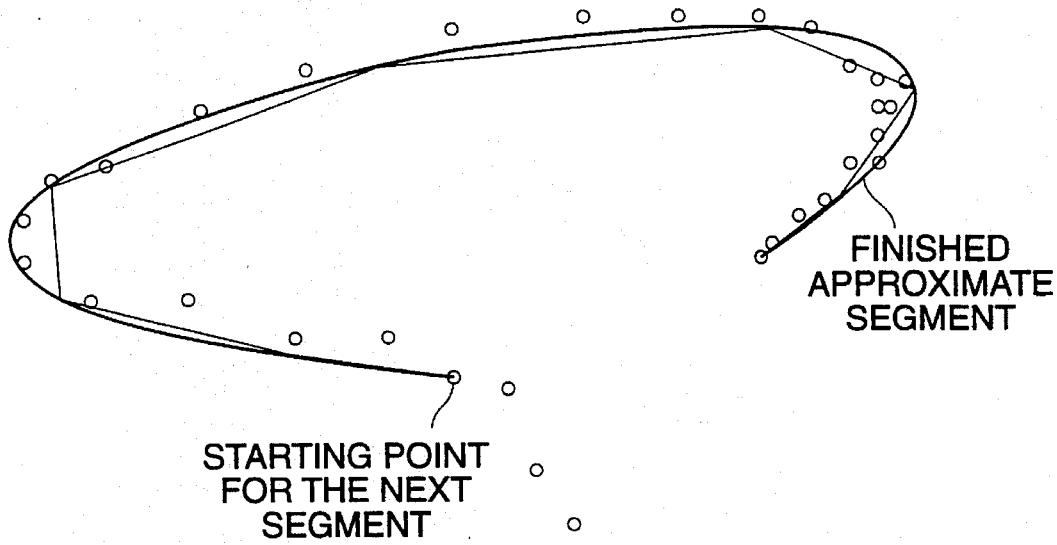
FIG. 3I shows the finished approximate segment.
Figure 3J:
FIG. 3J shows the approximation of the curve represented by the sequence of time-sampling points of FIG. 3C.

FIG. 3H shows the results of further iterations. After two iterations, the transformation-reparametrization procedure converges but the approximation error for the lengthened current segment fails to meet the predetermined goodness-of-fit threshold (conditional YES at step 360 in FIG. 3B). After five iterations, the procedure is stopped by a conditional NO at step 350 in FIG. 3B. The finished segment is then interpolated into the smooth curve shown in FIG. 3I by the procedure shown in the accompanying pseudocode program III starting at step 535.

The ending point of the finished segment is designated the starting point of the next segment of source curve (Step 380 of FIG. 3B). The iterative transformation-reparametrization process of approximating and lengthening the next current segment is then started. The process continues until the ending point of a successfully approximated current segment coincides with the final sampling point of the source curve. When the two points coincide, the entire curve has been approximated.

The following pseudo-code program further illustrates the iterative transformation-reparametrization technique of FIGS. 3A and 3B. For illustrative purposes, the technique is implemented with an approximation degree 3 and utilizing equations (I)–(IV) and (V)–(VIII).

```
// Program I: Piecewise polynomial approximation method using
the iterative transformation reparametrization technique.
BEGIN
      FOR i = 0 TO Q − 1 DO
         BEGIN
            INPUT x[i], y[i]
         END
// x[i], y[i] are arrays of Cartesian coordinates of the time
// sampling points on a source curve;
// Q is a total number of source time-sampling points;
      Ord = 3    // Degree of approximation.
      ReSam = 9  // Total number of points representing the
         // reparameterized current segment. It is chosen under
         //the assumption that the 16-point DFT is used to
         // implement the cosine-type transform.
300:
// The coordinates of the first time-sampling point are
// encoded using uniform-length code words.
      INPUT RANGE_FOR_x,   RANGE_FOR_y
      INPUT QUANTUM_FOR_x, QUANTUM_FOR_y
// RANGE_FOR_x, RANGE_FOR_y - ranges of possible variation
// QUANTUM_FOR_x, QUANTUM_FOR_y - quantization steps which are
// chosen in accordance with the resolution of reproduction
// device. For example, the time-sampling points can be
// provided by an input tablet with a variation range of
// coordinates from 0 to 2047. If the decompressed sample is
// to be restored on a screen having a resolution of
// 512 × 512 pixels, the quantization step is chosen
// to be no less than 4.
      WORD_LENGTH_x0 = ROUND( LOG2( RANGE_FOR_x / QUANTUM_FOR_x ))
      WORD_LENGTH_y0 = ROUND( LOG2( RANGE_FOR_y / QUANTUM_FOR_y ))
// WORD_LENGTH x, WORD_LENGTH_y - length of the uniform length
// code words.
      Q_x0       = QUANTIZE( x[0], QUANTUM_FOR_x )
      CODE_FOR_x0 = ASSIGN_CODE_WORD( Q_x0, WORD_LENGTH_x0 )
      Q_y0       = QUANTIZE( y[0], QUANTUM_FOR_y )
      CODE_FOR_y0 = ASSIGN_CODE_WORD( Q_y0, WORD_LENGTH_y0 )
// The output buffer Buf[i], i = 0 . . . is created
      Buf[0]     = DEQUANTIZE( SYMB_x )
      Buf[1]     = DEQUANTIZE( SYMB_y )
// The function DEQUANTIZE returns for SYMB_x (number of
// quantization range) the quantized value of x.
      nb = 2 // output buffer count.
      OUTPUT CODE_FOR_x0, CODE_FOR_y0;
// CODE_FOR_x0, CODE_FOR_y0 - the code words for the first
// time-sampling point of the source curve.
// The code words must be outputted as the bit sequence
// representative of the beginning of compressed data flow.
// This flow can be used by a decompression program such
// as, for example, the decompression program specified in
// pseudo-code program III.
      qc = 0 // the current number of a time-sampling point of
// the source curve.
305:
      xs = x[ qc ]
      ys = y[ qc ]
// xs, ys are the cartesian coordinates of the starting
// point of the segment. Since qc = 0 , the first
// time-sampling point is taken as the starting point of
// the first segment.
310:
      Np = 2
// Np - number of time-sampling points to be taken as the,
// initial part of the current segment.
      qs = 0 // the counter of time-sampling points of the current
// segment.
      APPEND_POINTS( Segx, Segy, qc, qs, Np )
// Segx, Segy are arrays of cartesian coordinates of
// time-sampling points of the current segment.
      qs = qs + Np
      qc = qc + Np
// The second time-sampling point is appended to the starting
// point to form an initial part of the current segment.
315:
// The next time-sampling-point is appended to the current
// segment as the current ending point with coordinates xe, ye.
      APPEND_POINTS( Segx, Segy, qc, qs, 1 )
      xe = Segx[ qs ]
      ye = Segy[ qs ]
```

-continued

```
        qs = qs + 1
        qc = qc + 1
// Function TRACING is used to obtain the description of
// the current segment to be used at step 320 for
// reparametrization.
        TRACING( Segx, Segy, qs, L )
325:
// The initial parametrization table PT[i], i = 0 . . . ReSam-1 is
// computed. In this example the table of natural
// parametrization
// is used ( arc length is chosen as a parameter
        FOR i = 0 TO i = ReSam-1 DO PT[ i ] = i
// i is the relative distance of the ith point to the starting
// point xs, ys along the current segment. Normalization of the
// initial parametrization table is performed to
// convert the relative distances into real distances along the
// current segment of source curve.
        LAM = L[ qs − 1 ] / PT[ ReSam-1 ]
// The counting of transformation-reparametrization cycles is
// started.
        Iter = 0 // iterations counter
320:
// LAM is the polygon's total length normalizer.
        NORMALIZE( PT, ReSam, LAM )
// Reparametrization is performed. The description of
// the current segment of the source curve, obtained at step
// 315 by the function TRACING is used.
     i = i
     FOR j = 1 TO ReSam-1
       BEGIN
         WHILE ( L[i] < PT[j] )
           BEGIN
             D = (L[i] − PT[j − 1]) / (PT[j] − PT[j − 1])
             RSegx[j] = Segx[i − 1] +
               Segx[i] − Segx[i − 1])*D
             RSegy[j] = Segy[i − 1] +
               Segy[i] − Segy[i − 1])*D
           END
         i = i + 1
       END
     RSegx[0] = Segx[0]
     RSegy[0] = Segy[0]
// The current segment of the source curve is represented by 9
// points with coordinates RSegx[j], RSegy[j], j = 0 . . . 8 and with
// distances to the starting point along the current segment of
// the source curve taken from a normalized parametrization
// table PT.
330, 335:
// The truncated and abridged set of cosine coefficients in
// this case includes only 4 non-modified coefficients. The
// forward cosine-type transform is reduced to direct
// computation of these coefficients using 9 points. The
// coefficients are computed using 16-point DFT formula:
// the sequences RSegx[i], RSegy[i] are assumed to be evenly
// continued.
     a2 = (xs − xe) / 8
     b2 = (ys − ye) / 8
     a3 = xs / 8
     b3 = ys / 8
     FOR i = 1 TO i = 7 DO
       BEGIN
         a2 = a2 + 2*RSegx[i]*COS(i*(2*PI/16)) / 8
         a3 = a3 + 2*RSegx[i]*COS(i*(3*PI/16)) / 8
         b2 = b2 + 2*RSegy[i]*COS(i*(2*PI/16)) / 8
         b3 = b3 + 2*RSegy[i]*COS(i*(3*PI/16)) / 8
       END
340:
// The abridged cosine coefficients are restored in
// modified form using edge conditions (V), (VI), (VII),
(VIII).
     A0 = (xs + xe)/2 − a2
     A1 = (xs − xe)/2 − a3
     B0 = (ys + ye)/2 − b2
     B1 = (ys − ye)/2 − b3
// The truncated and modified set of cosine coefficients is
// formed.
345:
// The inverse cosine-type transform is implemented in
// accordance with (3).
```

-continued

```
        FOR i = 0 TO i = 8 DO
        BEGIN
          ASegx[i] = A0 + A1*COS(1*(i*PI/16)) + a2*COS(2*(i*PI/16)) +
            a3*COS(3*(i*PI/16))
          ASegy[i] = B0 + B1*COS(1*(i*PI/16)) + b2*COS(2*(i*PI/16)) +
            b3*COS(3*(i*PI/16))
        END
// The approximate current segment is represented in
// parametric form by 9 sampling points ASegx[i], ASegy[i],
// i = 0 . . . 8.
350:
// First stage of error monitoring and of flow control. The
// sequence of mean-square-errors obtained by 4 latest
// iterations is used to calculate the sign of the error trend.
        Dev = 0
        FOR i = 0 TO i = ReSam-1 DO
        BEGIN
          Dev =
          Dev + (ASegx[i] − RSegx[i])^2 + (ASegy[i] − RSegy[i])^2
        END
        Iter = Iter + 1
        DEVIATION[ 1 ] = DEVIATION[ 2 ]
        DEVIATION[ 2 ] = DEVIATION[ 3 ]
        DEVIATION[ 3 ] = DEVIATION[ 4 ]
        DEVIATION[ 4 ] = Dev
        IF( Iter >= 4 ) THEN
        BEGIN
          TREND = COUNT_TREND( DEVIATION )
          IF( TREND < 0 ) THEN GOTO 355 ELSE GOTO 375
        END
335:
// The parametrization table is derived from approximate
// current segment applying the function TRACING to the
// description of approximate segment ASegx[i], ASegy[i],
// i = 0 . . . ReSam-1.
        TRACING( ASegx, ASegy, ReSam, PT )
360:
// The second stage of error monitoring and of flow control.
// The double checking of achieved approximation accuracy is
// performed.
        LAM = L[ qs − 1 ] / PT[ ReSam-1 ]
        IF ((1 − LAM^(−2)) > EPS_LAM OR Dev > EPS_DEV ) THEN GOTO 320 ELSE
          GOTO 365
// 1 − LAM^(−2) represents the normalized mean-square-error between
// the derivatives of the reparameterized source segment and
its
// approximation.
365:
// The set of segment descriptors containing the coordinates of
// the ending point as a first component and the truncated and
// abridged set of cosine coefficients as a second component
// is formed and stored.
        xe_cur = xe
        ye_cur = ye
        a2_cur = a2
        a3_cur = a3
        b2_cur = b2
        b3_cur = b3
370:
        Iter = 0
// Evaluation of the error trend is restarted before the
// current segment is lengthened
        GOTO 315
375:
// The set of segment descriptors updated at the step 365
// is the set of descriptors of the finished segment.
// The sequence of such sets is accumulated in buffer Buf.
          Buf[ nb     ] = a2_cur
          Buf[ nb + 1 ] = a3_cur
          Buf[ nb + 2 ] = b2_cur
          Buf[ nb + 3 ] = b3_cur
          Buf[ nb + 4 ] = xe_cur
          Buf[ nb + 5 ] = ye_cur
          nb = nb + 6
// Optionally, the procedure CODE_SEG is used for entropy
// encoding of the descriptors. If the entropy encoding
// is desired, then call
//
// CODE_SEG ( Buf, nb )
```

-continued

```
//
// for each finished segment. CODE_SEG is described in
// connection with the pseudo-code program II.
380:
// The ending point of the finished segment is taken as the
// starting point of a new segment
      xs = xe_cur
      ys = ye_cur
// The iterative transformation-reparametrization process is
// restarted for a new current segment if the point (xs, ys)
// is not the end-of-curve point.
      GOTO 310
END.
FUNCTION QUANTIZE( V, QUANTUM )
// For variable V, return the number of the nearest
// quantization level QV
      BEGIN
         QV = ROUND( V / QUANTUM )
// ROUND( X ) must return the nearest integer of X
         RETURN QV
      END
   FUNCTION ASSIGN_CODE_WORD( SYMB, WORD_LENGTH )
// Returns the uniform-length code word CODE_WORD as
// WORD_LENGTH lower bits of variable SYMB
      BEGIN
         CODE_WORD = lower WORD_LENGTH bits of SYMB
         RETURN CODE_WORD
      END
   FUNCTION APPEND_POINTS( Segx, Segy, qc, qs, Np )
// Appends Np time-sampling points of the source curve to the
// segment Segx, Segy
      BEGIN
         FOR i = 0 TO i = Np − 1 DO
         BEGIN
            Segx[ qs + i ] = x[ qc + i ]
            Segy[ qs + i ] = y[ qc + i ]
         END
         RETURN
      END
   FUNCTION TRACING( SX, SY, q, L )
// For the polygon represented by q vertexes with coordinates
// SX[i], SY[i], i = 0 . . . q − 1, compute for each vertex its
// distance L[i] to the starting vertex along the polygon.
      BEGIN
         L[ 0 ] = 0
         FOR i = 1 TO i = q − 1 DO
         BEGIN
            L[i] = L[i − 1] + SQRT((SX[i]_SX[i − 1])^2 + (SY[i] −
               SY[i − 1])^2
         END
      END
   FUNCTION NORM_TABLE( L, q, LAM )
// Performs the normalization of parametrization table L0
// having q entries by means of normalization factor LAM.
      BEGIN
         FOR i = 0 TO i = q − 1 DO
         BEGIN
            L[i] = L[i] * LAM
         END
      END
   FUNCTION COUNT_TREND( D )
// Trend is determined by the least-square method using the
// error values D[i], i = 0 . . . 3, obtained by the last 4
// iterations. The coefficient K of a straight line
// y = K*x + C satisfying the condition
//       SUM [ ( K*D[i] + C − D[i] )^2 ] −> min
//       i = 0 . . . 3
//
// is obtained.
      BEGIN
         K = ( −3*D[0] − D[1] + D[2] + 3*D[3] )/10
         RETURN K
      END
```

Figure 4:
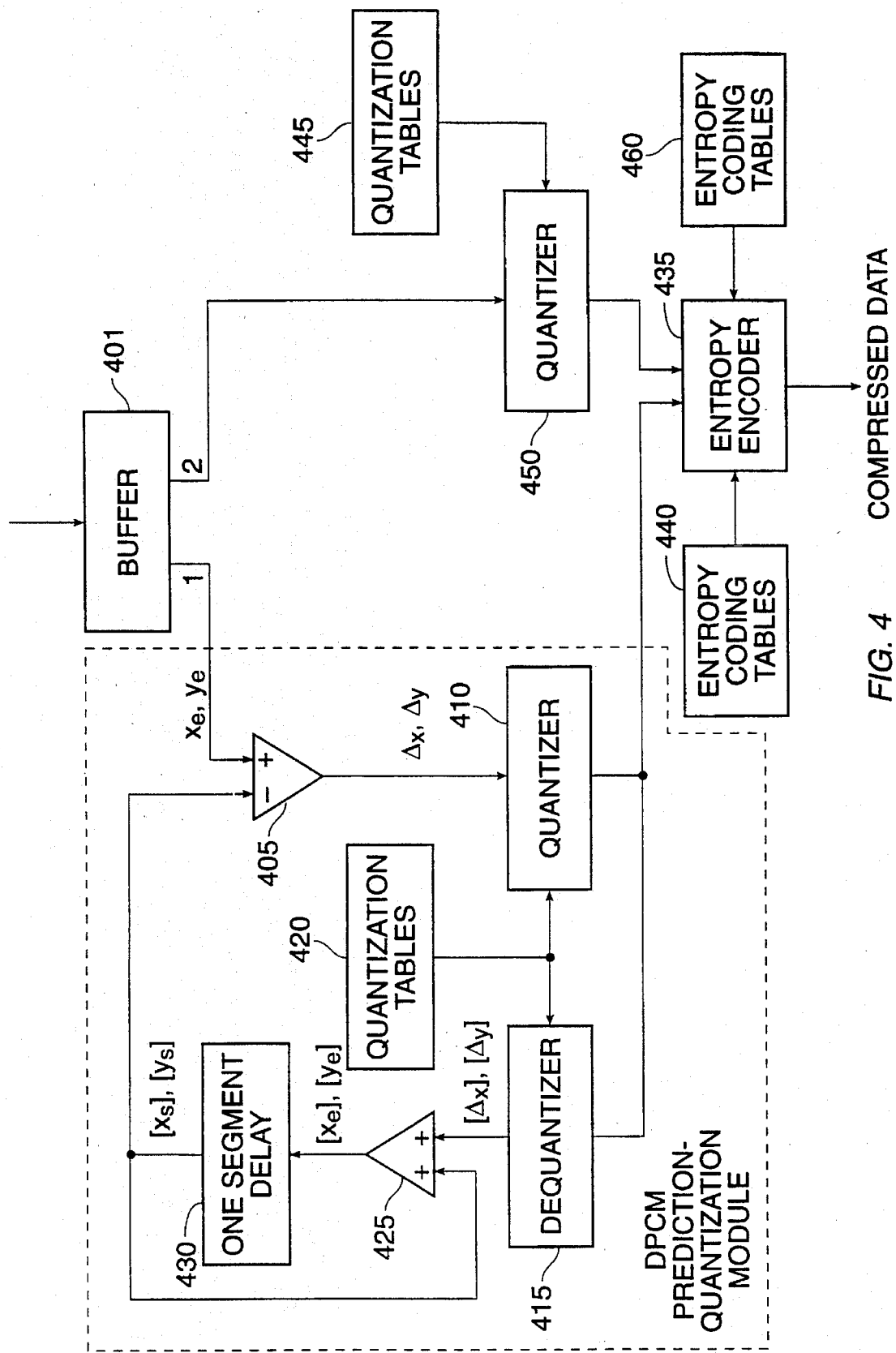
FIG. 4 is a flow chart illustrating an encoding process according to one aspect of the present invention.

FIG. 4 is a flow chart illustrating an encoding procedure according to one aspect of the invention. As is apparent from the discussion in connection with FIG. 3, the approximation process results, under given conditions of the approximation degree and accuracy, in a piecewise parametric description of the pen stroke by a relatively small number of polynomial segments. In other words, a relatively short sequence of the segment descriptors is obtained.

The entropy encoding of descriptors represents, in one embodiment, a way to further compress the set of segment description data representing the pen stroke. Prior to encoding, the set of segment descriptors includes two components for each segment: 1) the ending point coordinates $(x_e, y_e)$, and 2) the truncated, modified and additionally abridged set of cosine coefficients $A_2, A_3, \ldots, A_M; B_2, B_3, \ldots, B_M$. These two components are encoded in two different ways.

Since the coordinates of the borders between segments constitute a sequence with a certain degree of correlation, the technique of differential pulse code modulation (DPCM), which is well known in the art, can be used to encode the first component. Although DPCM is chosen here, it should be pointed out that any encoding technique, including adaptive DPCM, arithmetic coding, adaptive Huffman, and the like, that takes advantage of the correlation can be used.

Using DPCM, the ending point coordinates $(x_e, y_e)$ are obtained from the set of segment descriptors from a buffer 401 via a buffer output 1, and fed into the DPCM prediction-quantization module. As shown, the DPCM prediction-quantization module includes a subtracting element 405, a quantizer 410, a dequantizer 415, quantization tables 420, a summing element 425, and a one-segment-delay element 430. FIG. 4 shows a simple version of the DPCM module which predicts the value of the current sample in the sequence using a single previous sample.

The segment edge differences $\Delta x = x_e - [x_s]$, $\Delta y = y_e - [y_s]$, where $x_s$, $y_s$ represent the values predicted for $x_e$, $y_e$, respectively (the square brackets indicate the values deviated by quantization), are obtained by subtracting element 405 and converted by quantizer 410 into symbols using quantization tables 420.

At the decoding stage, the symbols are dequantized into values $[\Delta x]$, $[\Delta y]$. The decoding operations include a feedback module to prevent an accumulation of quantization errors. The feedback module utilizes a dequantizer 415, a summing element 425, and a one-segment-delay element 430. The same segment edge difference values $[\Delta x]$, $[\Delta y]$ mentioned above are obtained by dequantizer 415 and respectively added, by summing element 425, to cumulated sums $[x_s]$, $[y_s]$ of the previous dequantized differences. The addition operation yields the coordinates of the starting point of the next finished segment. These coordinate values are represented by the decoded values $[x_e]$, $[y_e]$. Previously decoded coordinates $[x_s]$, $[y_s]$ are to be replaced later by $[x_e]$, $[y_e]$ at the output of the one-segment-delay element 430. As is apparent from the foregoing, the present technique requires that the coordinates of the first sampling point of the source curve be available to start the prediction-quantization procedure.

Quantized segment edge differences $[\Delta x]$, $[\Delta y]$, generated in symbolic form by the DPCM prediction-quantization module, are encoded by entropy encoder 435 using coding tables 440.

The second component of the segment descriptors is obtained from buffer 401 via a buffer output 2. This second component represents the truncated, modified, and additionally abridged set of cosine coefficients and can be directly converted by quantizer 450, using quantization tables 445, into symbols to be encoded. The encoding process is accomplished using entropy encoder 435 and coding tables 460.

The following pseudo-code program further illustrates the entropy encoding of segment descriptors according to FIG. 4. Although the pseudo-code portions describing the entropy encoding technique are written in view of the specific embodiment implemented by the iterative transformation-reparametrization technique of FIGS. 3A and 3B and its corresponding pseudo-code program, the entropy encoding technique is not so limited. In the pseudo-code program below, Huffman coding is assumed.

```
// Program II: Entropy encoding of descriptors.
FUNCTION CODE_SEG ( Buf, nb )
   BEGIN
401:
// Quantized values of the coordinates of the first
// time-sampling point are taken to start the DPCM
// prediction-quantization process.
      IF nb=8 THEN
         BEGIN
            DEC_xs = Buf[ nb-8 ]
            DEC_ys = Buf[ nb-7 ]
         END
// The values of variables DEC_xs, DEC_ys must be saved between
// the calls of function CODE_SEG (static-type variables).
// The set of finished segment descriptors is taken from
// the buffer.
         a2 = Buf[ nb-6 ]
         a3 = Buf[ nb-5 ]
         b2 = Buf[ nb-4 ]
         b3 = Buf[ nb-3 ]
         xe = Buf[ nb-2 ]
         ye = Buf[ nb-1 ]
405:
// The first component xe, ye of the segment descriptors is
// fed into the DPCM prediction-quantization module.
         dx = xe - DEC_xs
         dy = ye - DEC_ys
420:
         INPUT QTABLE_420
410:
// The function QUANTIZER determines, using QTABLE_420, the
// quantization range of the value of dx and returns the
// number SYMB_dx representing this range.
```

-continued

```
        SYMB_dx = QUANTIZER( dx, QTABLE_420 )
        SYMB_dy = QUANTIZER( dy, QTABLE_420 )
415:
// The DPCM reconstruction feedback procedure is started.
// The function DEQUANTIZER returns, using QTABLE_420, the
// quantized (rounded) value DEC_dx of dx.
        DEC_dx = DEQUANTIZER( SYMB_dx, QTABLE_420 )
        DEC_dy = DEQUANTIZER( SYMB_dy, QTABLE_420 )
425:
// The coordinates of the ending points are reconstructed.
        DEC_xe = DEC_xs + DEC_dx
        DEC_ye = DEC_ys + DEC_dy
430:
// The reconstructed ending points DEC_xe, DEC_ye are taken as
// the starting point for the next finished segment.
            DEC_xs = DEC_xe
            DEC_ys = DEC_ye
445:
        INPUT a2_QTABLE_445, a3_QTABLE_445, b2_QTABLE_445,
b3_QTABLE_445
450:
// The second component of the segment descriptors (truncated
// and abridged set of cosine coefficients) is quantized
// before the entropy encoding. See commentary to step 410.
        SYMB_a2 = QUANTIZER( a2 , a2_QTABLE_445 )
        SYMB_a3 = QUANTIZER( a3 , a3_QTABLE_445 )
        SYMB_b2 = QUANTIZER( b2 , b2_QTABLE_445 )
        SYMB_b3 = QUANTIZER( b3 , b3_QTABLE_445 )
440:
// Separate Huffman coding tables are used to
// encode each of segment descriptors.
        INPUT dx_QTABLE_440, dy_QTABLE_440
455:
        INPUT a2_QTABLE_455, a3_QTABLE_455, b2_QTABLE_455,
b3_QTABLE_455
435:
        CODE_FOR_dx = ASSIGN_HUFFMAN_CODE_WORD( SYMB_dx,
dx_CTABLE_440 )
        CODE_FOR_dy = ASSIGN_HUFFMAN_CODE_WORD( SYMB_dy,
dy_CTABLE_440 )
        CODE_FOR_a2 = ASSIGN_HUFFMAN_CODE_WORD( SYMB_a2,
a2_CTABLE_455
        CODE_FOR_a3 = ASSIGN_HUFFMAN_CODE_WORD( SYMB_a3,
a3_CTABLE_455 )
        CODE_FOR_b2 = ASSIGN_HUFFMAN_CODE_WORD( SYMB_b2,
b2_CTABLE_455 )
        CODE_FOR_b3 = ASSIGN_HUFFMAN_CODE_WORD( SYMB_b3,
b3_CTABLE_455 )
OUTPUT CODE_FOR_dx, CODE_FOR_dy
OUTPUT CODE_FOR_a2, CODE_FOR_a3, CODE_FOR_b2, CODE_FOR_b3
// All code words must be outputted as a bit sequence
// representing the compressed data flow. This flow can be
// Used by a decompression program such as the
// decompression program specified by the pseudo-
// code program III.
        END    // of the function CODE_SEG
```

Figure 5:
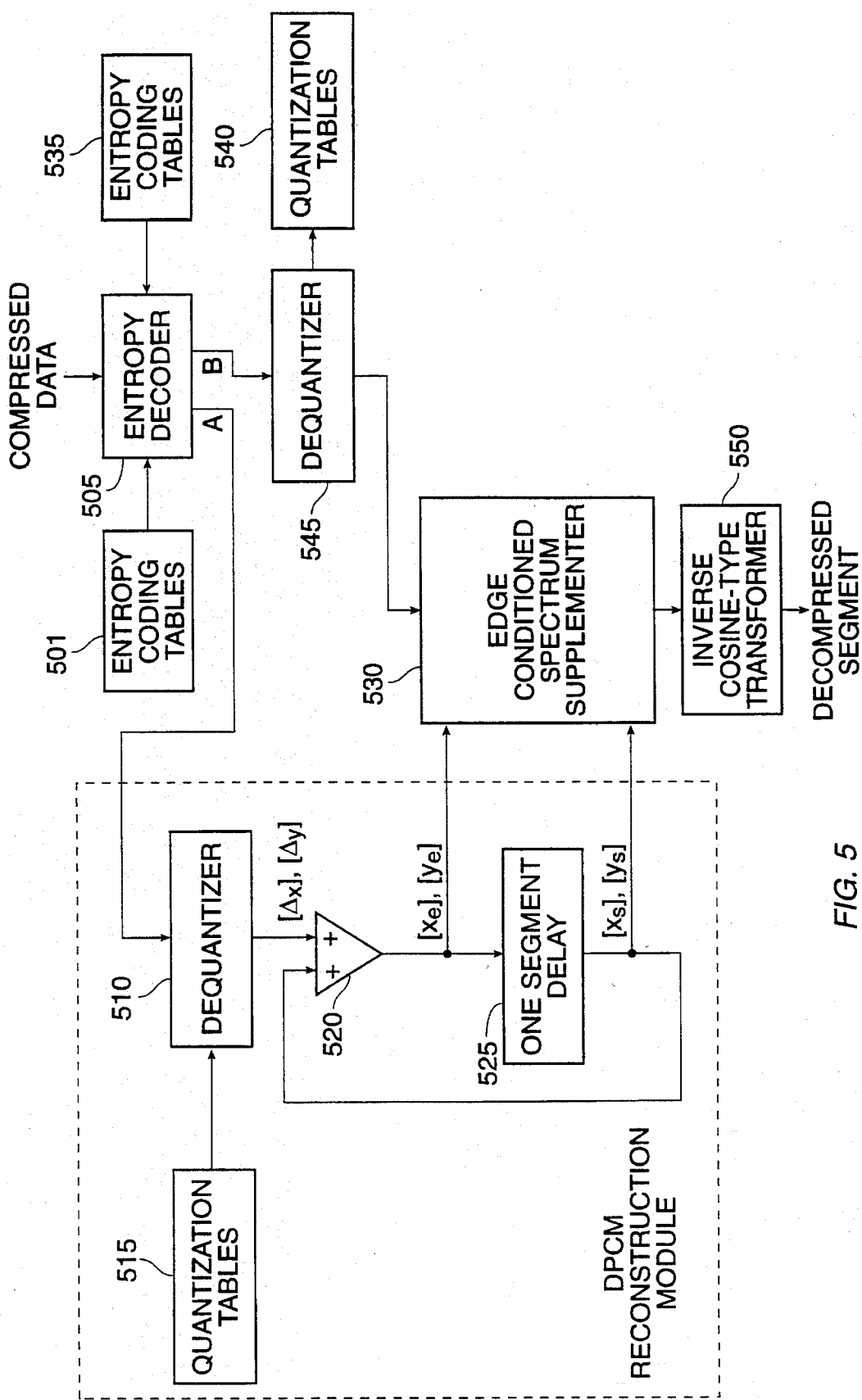
FIG. 5 is a flow chart illustrating a decoding process according to one aspect of the present invention.

FIG. 5 is a flow chart illustrating a decoding procedure in accordance with one aspect of the present invention. The decoding procedure can be utilized for sequential reconstruction of finished segments in parametric form from the flow of compressed data.

The symbols representing the first component of the set of segment descriptors, the segment edge differences, are first obtained at the output A of an entropy decoder 505 using coding tables 501. The symbols are then fed into a DPCM reconstruction module. As shown in FIG. 5, the DPCM module utilizes a dequantizer 510, quantization tables 515, a summing element 520 and a one-segment-delay element 525. Quantized values [$\Delta$x],[$\Delta$y] of the segment edge differences are obtained using quantization tables 515 and dequantizer 510. The quantized values [$\Delta$x],[$\Delta$y] are then added by summing element 520 to cumulated sums [$x_s$],[$y_s$] of previous dequantized differences, resulting in ending point values [$x_e$],[$y_e$]. The coordinates of the segment starting and ending points, obtained respectively at the input and the output of the one-segment-delay element 525 as values affected by the quantization errors, are fed into an edge-conditioned spectrum supplementer 530 as described below.

The second component of the set of segment descriptors, i.e., the truncated, modified and additionally abridged set of cosine coefficients, is first obtained in symbolic form at the output B of entropy decoder 505 using coding tables 535. The set is then dequantized, using quantization tables 540 and a dequantizer 545, resulting in the truncated, modified and abridged set of cosine coefficients: [$A_2$], [$A_3$], . . . , [$A_M$]; [$B_2$], [$B_3$], . . . , [$B_M$]. At this stage, the set affected by quantization errors. The set of abridged coefficients is then restored by the edge-conditioned spectrum supplementer 530 using the decoded values [$x_s$],[$y_s$] and [$x_e$],[$y_e$] as coordinates of the segment borders.

The following procedure assumes that the spectrum modification and abridgment operations in the approximation process were performed in the particular manner described above using conditions (V)–(VIII) to derive the modified coefficients $A_0$, $A_1$, $B_0$, $B_1$. Four abridged coefficients are calculated at the decoding stage by spectrum supplementer 530 as the modified values $\overline{A}_0, \overline{A}_1, \overline{B}_0, \overline{B}_1$ corrected by the actual quantization errors:

$$\overline{A}_0 = [X_s] = [X_e] - \frac{1}{2} \sum_{m=1}^{L} [a_{2m}], \qquad \text{IX}$$

$$\overline{A}_1 = [X_s] - [X_e] - \frac{1}{2} \sum_{m=2}^{L} [a_{2m-1}], \qquad \text{X}$$

$$\overline{B}_0 = [Y_s] + [Y_e] - \frac{1}{2} \sum_{m=1}^{L} [b_{2m}], \qquad \text{XI}$$

$$\overline{B}_1 = [Y_s] - [Y_e] - \frac{1}{2} \sum_{m=1}^{L} [b_{2m-1}]. \qquad \text{XII}$$

The set of decoded cosine coefficients supplemented by the corrected abridged coefficients permits the adjacent segments, upon reconstruction at the decoding stage, to properly abut one another in spite of the quantization errors.

The truncated set of decoded cosine coefficients obtained by spectrum supplementer 530 is then used by the inverse cosine-type transform module 550 to represent the segment by an arbitrarily chosen number of sampling points. The size of the inverse transform can be chosen in accordance with the desired number of sampling points. The truncated set of decoded cosine coefficients is then supplemented by zeroes to meet the chosen size of the inverse transform.

The Huffman coding, well known in the art, was found to be the suitable entropy coding tool for the segment edge differences, as well as for the cosine coefficients obtained from handwritten texts or drawings by the piecewise approximation process. The different quantization and coding tables can be used for various cosine coefficients, or for groups of coefficients to achieve better compression efficiency. Further, other techniques such as the known technique of vector quantization can also be applied to the set of descriptors.

As is apparent from discussion in connection with FIGS. 4 and 5, the coordinates of the segment border, which are a part of the segment descriptors, are advantageously utilized in the encoding-decoding procedure to ensure the proper abutment of reconstructed segments and to reduce the influence of quantization errors on the quality of the reproduced curve.

The following pseudo-code program further illustrates the entropy decoding technique of FIG. 5. Although the pseudo-code program was written in view of the specific embodiment implemented by the techniques of FIGS. 3 and 4 and their corresponding pseudo-code programs, the decoding procedure described herein is not so limited. The same quantization and coding tables used in FIG. 4 and its corresponding pseudo-code program, as well as the same WORD_LENGTH_x0, WORD_LENGTH_y0 used in FIG. 3 and its corresponding pseudo-code program, are used.

```
// Program III: Entropy Decoding of Compressed Data.
INPUT COMPR_DATA_FLOW
// COMPR_DATA_FLOW is the sequence of bits obtained by Part II.
501:
      INPUT WORD_LENGTH_x0, WORD_LENGTH_y0[001b]
      INPUT dx_QTABLE_501, dy_QTABLE_501
550:
      INPUT a2_QTABLE_535, a3_QTABLE_535, b2_QTABLE_535,
b3_QTABLE_535
505:
   PERFORM THE STANDARD HUFFMAN DECODING PROCEDURE
   DIVIDING COMPRESSED DATA FLOW INTO SEQUENCE OF CODE WORDS
      CODE_FOR_x0, CODE_FOR_y0,
      CODE_FOR_dx[i], CODE_FOR_dy[i],
      CODE FOR a2[i], CODE FOR a3[i], CODE FOR b2[i],
CODE_FOR_b3[i]
   AND CONVERTING CODE WORDS INTO CORRESPONDING SEQUENCE OF
QUANTIZED DESCRIPTORS
      SYMB_x0,      SYMB_y0,
      SYMB_dx[i],   SYMB_dy[i],
      SYMB_a2[i],   SYMB_a3[i], SYMB_b2[i], SYMB_b3[i]
(i=0 . . . Nseg-1; Nseg is the total number of finished segments
in pen-stroke)
// The coordinates of the first time-sampling point of source
// curve must be the first of all decoded values to start DPCM
// reconstruction procedure (in this case due to uniform length
// coding the decoded values DEC_xs, DEC_ys are the same as the
// quantized values SYMB_x0, SYMB_y0 ).
      DEC_xs = SYMB_x0
      DEC_ys = SYMB_y0
// The loop of sequential decoding ( reconstruction )
// of segments begins;
// Nseg is the total number of segments in the pen-stroke.
         FOR i=0 TO i=Nseg-1 DO
            BEGIN
515:
// The DPCM reconstruction of the first component of segment
// descriptors is started.
               INPUT QTABLE_515
510:
               DEC_dx = DEQUANTIZER( SYMB_dx[i], QTABLE_515 )
               DEC_dy = DEQUANTIZER( SYMB_dy[i], QTABLE_515 )
```

```
520:
            DEC_xe = DEC_xs + DEC_dx[i]
            DEC_ye = DEC_ys + DEC_dy[i]
// To be used for supplementing the abridged set of cosine
// coefficients at step 530: as the ending point of the segment
// and the starting point of the next segment at the next
// decoding table.
540:
            INPUT QTABLE_540
545:
// The truncated and abridged set of cosine coefficients is
// decoded
            DEC_a2 = DEQUANTIZER( SYMB_a2[i], QTABLE_515 )
            DEC_a3 = DEQUANTIZER( SYMB_a3[i], QTABLE_515 )
            DEC_b2 = DEQUANTIZER( SYMB_b2[i], QTABLE_515 )
            DEC_b3 = DEQUANTIZER( SYMB_b3[i], QTABLE_515 )
530:
// The abridged cosine coefficients with modified values
// corrected by quantization errors is restored using
// edge conditions according to (IX)–(XII).
            DEC_A0 = ( DEC_xs + DEC_xe )/2 + DEC_a2
            DEC_A1 = ( DEC_xs – DEC_xe )/2 – DEC_a3
            DEC_B0 = ( DEC_ys + DEC_ye )/2 + DEC_b2
            DEC_B1 = ( DEC_ys – DEC_ye )/2 – DEC_b3
535:
// The number of sampling points to represent the reconstructed
// segment is chosen to be 18 in this case.
    FOR j=0 TO j=17 DO
        BEGIN
           DEC_Segx[i][j]=DEC_A0+DEC_A1*COS(1*(j*PI/17))+
           DEC_a2*COS(2*(j*PI/17))+DEC_a3*COS(3*(j*PI/17))
           DEC Segy[i][j]=DEC_B0+DEC_B1*COS(1*(j*PI/17))+
           DEC_b2*COS(2*(j*PI/17))+DEC_b3*COS(3*(j*PI/17))
        END
OUTPUT DEC_Segx[i], DEC_Segy[i]
// The sequence of decompressed data ready to display the
// reconstructed pen-stroke.
525:
// The starting of the new decoding cycle for the next segment.
            DEC_xs = DEC_xe
            DEC_ys = DEC_ye
    END // cycle for i
```

Figure 6:
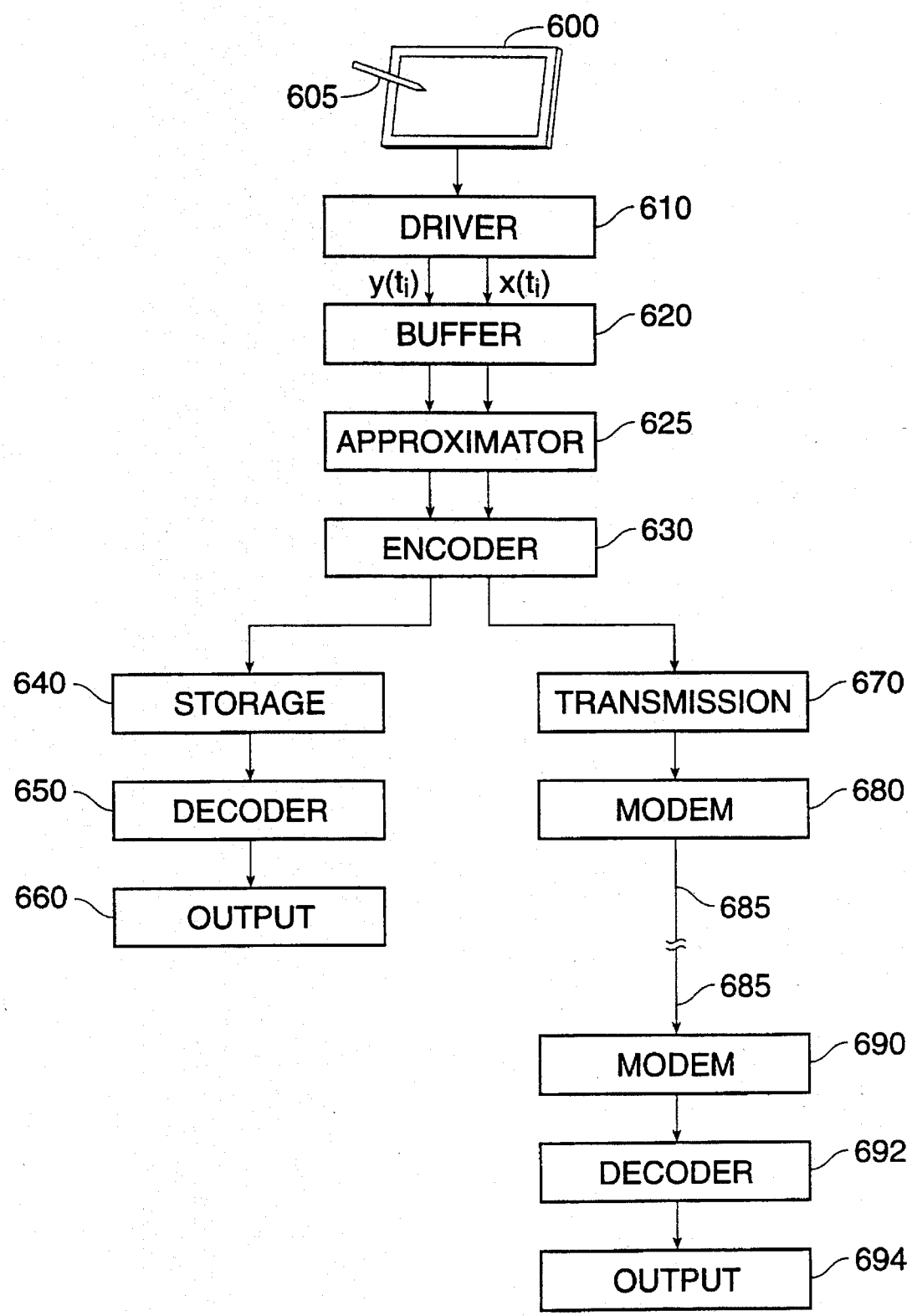
FIG. 6 is a simplified block diagram of the compression process according to one aspect of the present invention.

FIG. 6 is a flow chart illustrating the operation of the improved data compression system according to one embodiment of the present invention. A handwritten sample is obtained using a digitizer tablet 600 and a stylus 605. A driver 610 receives sampled digital data from digitizer tablet 600 and transmits the sampled digital data to a buffer 620. Buffer 620 is selected to have sufficient memory to buffer the incoming sampled digital data for use by an approximator 625 and an encoder 630.

Approximator 625 receives the buffered, sampled digital data and applies the piecewise polynomial approximation method using iterative transformation reparametrization technique of the present invention to the buffered data. As discussed in connection with FIG. 3, the handwritten sample which is represented by the sampled digital data is approximate segment by segment. For each segment successfully approximated, approximator 625 outputs a set of segment descriptor data in the manner discussed in connection with FIG. 3. Encoder 630 can be constructed in the manner discussed in connection with FIG. 4 and further compresses the segment descriptor data.

FIG. 6 also shows a storage unit 640. Storage unit 640 can be a memory, an array of registers, magnetic memory, optical memory, or the like in a computer system. Storage unit 640 stores the set of compressed data defining the sample.

When a reconstructed sample is required, storage module 640 furnishes the set of compressed descriptor data to a decoder module 650 for reconstruction. Starting with the coordinates of the starting point of the sample, the end border of the first segment is reconstructed in the manner discussed in connection with FIGS. 3 and 5. The segment descriptor data is reconstructed and the segment is then outputted to an output device 660. Output device 660 can be a cathode ray tube, a liquid crystal display screen, a printer, or the like. Subsequent segments are successively reconstructed and outputted until the entire sample is reconstructed and outputted.

Alternatively, the set of compressed data defining the sample can be transmitted via a transmission facility 670 and a modem 680 or other transmission methods well known in the art including fiber optics and wireless transmission to another computer or output device to be processed. For example, FIG. 6 shows a transmission system comprising a transmission wire 685, a modem 680 and a modem 690 for carrying the compressed data defining the sample to a distant decoder 692 and an output device 694. Decoder 692 has been discussed in connection with FIG. 5. Output device 694 can be an off-site printer or a computer monitor. This aspect of the invention is included to show that it is possible to have separate compression and reconstruction facilities without departing from the scope and spirit of the present invention.

As another alternative, the set of descriptor data from approximator 625 can be used in its unencoded state, either by the same computer or by a remote computer via an appropriate transmission facility, to represent a curve. Although it is preferable from a compression standpoint to form a set of segment descriptors from the truncated and abridged set of coefficients, a curve can also be represented by a set of segment descriptors which includes the truncated and unabridged set of coefficients without departing from the scope and spirit of the present invention. The representation of a curve using piecewise polynomial approximation method using the iterative transformation reparametrization technique can be accomplished using either an abridged or an unabridged set of coefficients, and with or without the use of an encoding facility.

Furthermore, the method is adaptable for representation of curves described in multi-dimensional space. Such a representation has uses, for example, in the compression art. For example, the pressure p(t) exerted by the pen upon the tablet can be captured and used as the third component of the parametric description of a three-dimensional curve. In applications where pressure data is used, the three functions x(t), y(t), and additionally p(t) can be taken to be the parametric representation of a three-dimensional curve. The representation method of the present invention can then be applied to this three-dimensional curve.

As a further example, the angles between the stylus and the tablet can be captured and used as additional components of the parametric description of a multi-dimensional curve. As can be appreciated, the method of the present invention is not limited in practice to any fixed dimension.

Although compression has been used to illustrate the operation of the inventive method, the piecewise fitting using the iterative transformation-reparametrization method disclosed herein can also be applied to other areas of line-drawn graphics. For example, graphical objects including curves in computer-aided geometric-design art can advantageously be represented, analyzed, and manipulated using the present method. As a further example, the present method can be applied to the filtration, smoothing, and analytical representation of experimental data, particularly those having noises. Although the specific embodiment makes reference to a computer having one processor, the technique can be performed on a multi-processor computer, including computers having multiple parallel processors and computers interconnected in a network, without departing from the scope and spirit of the present invention. Techniques of adapting softwares for use with the above-mentioned computers are well known in the art and are readily apparent to those of ordinary skill in the art.

The invention has now been explained with reference to specific embodiments. Other embodiments will be apparent to those of ordinary skill in the art. It is therefore not intended that this invention be limited, except as indicated by the appended claims.

What is claimed is:

1. A computer system for representing image data using polynomial approximation and iterative transformation-reparametrization, said computer system having a memory means and output means, said computer system comprising:

a digitizer for inputting and converting a curve into a binary format;

first memory location in said memory means for storing a first set of data points representing said curve including a first curve end in said binary format;

processor means coupled to said memory means and comprising means for:

1) transforming parametric representations of segments of said source curve to obtain truncated cosine coefficient representations of said line segments, 2) inverse transforming said truncated cosine coefficient representations to obtain parametric representations of approximations of said line segments, 3) computing parametrizations of said approximations of said line segments from said parametrizations of said approximations, 4) normalizing said parametrizations of said approximations to said line segments to obtain normalized parametrizations of said line segments, 5) reparametrizing said line segments in accordance with said normalized parametrizations to obtain successor parametric representations of said line segments, 6) approximating a selected segment of said source curve by a) obtaining an initial parametrization of said selected segment as an initial input for said transforming means, b) repeatedly applying said inverse transforming means, parametrization computing means, normalizing means, reparametrization means, and transforming means until an output of said inverse transforming means meets a predetermined goodness-of-fit criterion when compared to said selected segment or a convergence criterion, and c) storing the last output of said transforming means in said second memory means as a compressed representation of said selected segment, 5) compressing said source curve by applying said approximating means to obtain a compressed representation of a designated segment of said source curve and then iteratively extending said designated segment along said source curve to obtain extended segments and applying said approximating means to said extended segments until said approximating means converges without meeting said goodness-of-fit criterion; and second memory location in said memory means for storing a second set of data points, said second data points set designating a compressed representation of a final extended designated segment generated by said means for compressing.

2. The computer system of claim 1 wherein said processor means further comprises:

means for designating a first segment of said source curve beginning at said first curve end and applying said compressing means to said first segment to obtain a compressed representation of an extension of said first segment; and means for designating a second segment beginning at an end of said extension of said first segment and applying said compressing means to said second segment to obtain a compressed representation of an extension of said second segment.

3. The computer system of claim 2 wherein said processor means further comprises:

edge condition processing means for modifying said cosine coefficient representations to satisfy at least two edge conditions defining a boundary between said extension of said first segment and said second segment.

4. The computer system of claim 2 wherein said processor means further comprises Huffman encoding means for further compressing said compressed representations of said extensions of said first and second segments along with beginning and end coordinates of said extensions of said first and second segments.

5. The computer system of claim 1 wherein said processor means further comprises:

means for designating successive segments of said source curve and applying said compressing means to said successive segments until said compressing means extends a designated segment to an end of said source curve opposite said first end, wherein said first segment begins at said first curve end and other successive segments abut the extensions of previous designated segments as generated by said compressing means.

6. In a computer system having a processor means and a memory coupled to said processor means, a method for representing a curve, said method comprising the steps of:

i) storing in a first memory means a sampled data point curve representation; thereafter ii) approximating with said processor means said curve utilizing said curve representation by:

a) demarcating with said processor means a current segment;

b) lengthening with said processor means said current segment by appending an adjacent fragment of said curve representation to said current segment, thereby lengthening said current segment;

c) parameterizing with said processor means said lengthened current segment employing a first parametrization table;

d) deriving with said processor means a set of cosine coefficients via a forward cosine-type transform on said lengthened current segment;

e) truncating with said processor means said set of cosine coefficients, thereby obtaining a set of truncated cosine coefficients;

f) modifying with said processor means said set of truncated cosine coefficients to satisfy at least two specific edge conditions, thereby obtaining a set of truncated and modified cosine coefficients;

g) obtaining with said processor means a parametric representation of an approximation of said lengthened current segment via an inverse cosine-type transform on said set of truncated and modified cosine coefficients;

h) computing with said processor means a first approximation error and storing said first approximation error in a memory array;

i) if a trend of approximation errors tends toward a first predetermined goodness-of-fit threshold:

i1) recomputing with said processor means said first parametrization table utilizing said approximation of said lengthened current segment;

i2) if said first approximation error is worse than a second predetermined goodness-of-fit threshold, repeating with said processor means the method starting at step c;

i3) if said first approximation error is not worse than said second predetermined goodness-of-fit threshold, forming a first set of segment descriptors representing said current segment and storing in a second memory means said first set of segment descriptors and repeating with said processor means the method starting at step b, taking said lengthened current segment as a new said current segment; and j) if said trend of approximation errors does not tend toward said first predetermined goodness-of-fit threshold, designating with said processor means the ending point of said current segment the starting point of a new said current segment, and repeating with said processor means the method starting at step b.

7. The method of claim 6 wherein said sampled data point curve representation is time-sampled.

8. The method of claim 6 wherein said two specific edge conditions are the coordinates of a curve end.

9. The method of claim 6 wherein said first predetermined goodness-of-fit threshold and said second predetermined goodness-of-fit threshold are the same.

10. The method of claim 6 wherein said step of forming said set of segment descriptors comprises the steps of:

forming a set of coordinates for the ending point of said current segment; and obtaining with said processor means a truncated and abridged set of cosine coefficients by discarding the four coefficients of the lowest degrees from said set of truncated and modified cosine coefficients.

11. The method of claim 6 wherein said step of forming said set of segment descriptors comprises the steps of:

forming with said processor means a set of values representing the difference in the coordinates of the ending point and the starting point of said current segment; and obtaining with said processor means a truncated and abridged set of cosine coefficients by removing the four coefficients of the lowest degrees from said set of truncated and modified cosine coefficients.

12. In a computer system having a memory means, processor means, and output means, a method for compressing a source curve comprising the steps of:

a) digitizing said source curve to obtain a binary representation of said source curve;

b) designating a first segment of said source curve;

c) parameterizing said first segment to obtain an initial parametric representation of said first segment;

d) transforming said initial parametric representation to obtain a cosine coefficient representation;

e) truncating said cosine coefficient representation to obtain a truncated cosine coefficient representation;

f) inverse transforming said truncated cosine coefficient representation to obtain a parametric representation of an approximated segment;

g) computing a parametrization of said approximated segment from said parametric representation of said approximated segment;

h) normalizing said parametrization of said approximated segment to obtain a successor parametrization of said first segment;

i) reparameterizing said first segment in accordance with said successor parametrization to obtain a successor parametric representation of said first segment;

j) transforming said successor parametric representation to obtain a new cosine coefficient representation;

k) comparing said approximated segment to said first segment to determine if a predetermined goodness-of-fit criterion or convergence criterion has been met;

l) repeating said e), f), g), h), i), j) and k) steps until one of said predetermined criteria has been met;

m) storing a final truncated cosine coefficient representation generated in said j) step as a compressed representation of said first segment; and n) entropy encoding said compressed representation to obtain a further compressed representation of said first segment.

13. The method of claim 12 wherein said n) step comprises Huffman encoding.

14. The computer system of claim 13 wherein said processor means coupled to said memory means further comprises:

means for forming a current segment having as a first segment end said first curve end;

iterating means for lengthening said current segment to obtain a lengthened current segment, for parameterizing said lengthened current segment with a parametrization table to obtain a parameterized lengthened current segment, for performing a forward cosine-type transform on said parameterized lengthened current segment to derive a third set of cosine coefficients, for truncating said third cosine coefficients set according to a predetermined degree of approximation to form a truncated set, for modifying said truncated set to satisfy at least two edge conditions defining said lengthened current segment to obtain a modified set, for performing an inverse cosine-type transform on said modified set to form an approximation of said lengthened current segment, for deriving a parametrization of said approximation, for normalizing said parametrization of said approximation to said lengthened current segment to obtain a normalized parametrization, for applying said normalized parametrization to said lengthened current segment to obtain a successor parameterized lengthened current segment, for computing an approximation error between said approximation and said lengthened current segment; and means responsive to said iterating means for designating as a next-to-last-lengthened current segment said piecewise segment if a trend of approximation errors does not tend toward a predetermined goodness-of-fit threshold.

15. The computer system of claim 14 wherein said processor means coupled to said memory means further comprises means for recomputing said parametrization table if said trend of approximation errors tends toward said predetermined goodness-of-fit threshold.

16. The computer system of claim 13 wherein said means for optimizing comprises:

means for truncating said first set of coefficients to obtain said second sets of coefficients.

17. The computer system of claim 13 wherein said means for optimizing comprises:

means for applying boundaries between abutting segments of said curve as boundary conditions to modify said first set of coefficients.

18. The computer system of claim 13 wherein said processor means further comprises means for:

obtaining said first sets of cosine coefficients by approximating initial portions of said successive abutting segments.

19. A computer system for representing image data using polynomial approximation and iterative transformation-reparametrization, said computer system having a memory means and output means, said computer system comprising:

a digitizer for inputting and converting a curve into a binary format;

first memory location in said memory means for storing a first set of data points representing said curve including a first curve end in said binary format;

processor means, coupled to said memory means, comprising means for representing successive abutting segments of said curve as first sets of cosine coefficients and means for optimizing said first sets of cosine coefficients to obtain second sets of cosine coefficients; and second memory location in said memory means for storing said second sets of cosine coefficients.

20. In a computer system having a processor and a memory means coupled to said processor means, a method for representing a curve comprising the steps of:

digitizing a curve into a binary format with a digitizer means and storing at a first portion of said memory means a first set of data points representative of a first curve end;

demarcating a piecewise segment of said curve with said processor means and storing said segment at a second portion of said memory means;

deriving a first set of cosine coefficients approximately representing said piecewise segment with said processor means and storing said first cosine coefficients set at a third portion of said memory means;

storing at a fourth portion of said memory means a second set of data points designating a piecewise segment ending point; and optimizing with said processor means said first cosine set and storing said optimized second cosine set at a sixth portion of said memory means.

21. The method of claim 20 wherein said step of optimizing said second cosine set comprises the step of truncating said second cosine set with said processor means and storing said truncated second cosine set at a seventh portion of said memory means.

22. The method of claim 21 wherein said step of optimizing said second cosine set further comprises the step of modifying said truncated version of said second cosine set to satisfy at least two edge conditions defining said curve portion with said processor means and storing said modified version at an eighth portion of said memory means.

23. In a computer system having a processor and a memory means coupled to said processor means, a method for representing a curve comprising the steps of:

digitizing a curve into a binary format with a digitizer means and storing at a first portion of said memory means a first set of data points representative of a first curve end;

forming a current segment having as a first segment end said first curve end with said processor means and storing said current segment at a second portion of said memory means;

iteratively lengthening said current segment with said processor means to obtain a lengthened current segment and storing said lengthened current segment at a third portion of said memory means, parameterizing said lengthened current segment according to a parametrization table with said processor means and storing said parameterized current segment at a fourth portion of said memory means, performing a forward cosine-type transform on said parameterized current segment to derive a first set of cosine coefficients with said processor means and storing said first cosine set at a fifth portion of said memory means, truncating said first cosine set to form a truncated set according to a predetermined degree of approximation with said processor means and storing said truncated first cosine set at a sixth portion of said memory means, modifying said truncated set to satisfy at least two edge conditions defining said lengthened current segment to obtain a modified set with said processor means and storing said modified set at a seventh portion of said memory means, performing an inverse cosine-type transform on said modified set to form an approximation of said lengthened current segment with said processor means and storing said approximation at an eighth portion of said memory means, deriving a parametrization of said approximation and storing said parametrization of said approximation at a ninth portion of said memory means, normalizing said parametrization of said approximation to obtain a normalized parametrization and storing said normalized parametrization at a tenth portion of said memory means, applying said normalized parametrization to said lengthened current segment to obtain a successor parametrized current segment and storing said successor parametrized current segment at said fourth location of said memory means, computing an approximation error between said approximation and said lengthened current segment with said processor means and storing said approximation error at a eleventh portion of said memory means;

designating a next-to-last-lengthened current segment of said piecewise segment if a trend of approximation errors does not tend toward a predetermined goodness-of-fit threshold with said processor means and storing said designated next-to-last-lengthened current segment at a twelfth portion of said memory means as a current piecewise segment;

deriving a second set of cosine coefficients approximately representing said piecewise segment with said processor means and storing said second cosine coefficients set at an thirteenth portion of said memory means; and storing at a fourteenth portion of said memory means a second set of data points designating a piecewise segment ending point.

24. The method of claim 23 wherein said step of demarcating said piecewise segment further comprises:

recomputing said parametrization table if said trend of approximation errors tends toward said predetermined goodness-of-fit threshold with said processor means and storing said recomputed table at an eighteen portion of said memory means.

* * * * *